(12) United States Patent
Lu et al.

(10) Patent No.: US 12,512,561 B2
(45) Date of Patent: Dec. 30, 2025

(54) ELECTROCHEMICAL CELL INCLUDING PIEZOELECTRIC STRUCTURE THAT REDUCES SOLID-ELECTROLYTE INTERPHASE LAYER GROWTH ON ELECTRODE, AND METHOD FOR USING THE SAME

(71) Applicant: THE REGENTS OF THE UNIVERSITY OF MICHIGAN, Ann Arbor, MI (US)

(72) Inventors: Wei Lu, Ann Arbor, MI (US); Tianhan Gao, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 614 days.

(21) Appl. No.: 17/884,206

(22) Filed: Aug. 9, 2022

(65) Prior Publication Data
US 2023/0086348 A1  Mar. 23, 2023

Related U.S. Application Data

(60) Provisional application No. 63/231,830, filed on Aug. 11, 2021.

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/414* (2021.01); *H01M 50/431* (2021.01)

(58) Field of Classification Search
CPC ............ H01M 50/449; H01M 50/414; H01M 50/431; H01M 10/0525
(Continued)

(56) References Cited

U.S. PATENT DOCUMENTS

| 5,378,551 | A | 1/1995 | Meadows et al. |
| 2009/0111025 | A1 * | 4/2009 | Lee ..................... H01M 50/446 429/251 |

(Continued)

FOREIGN PATENT DOCUMENTS

| DE | 102013021228 A1 | 6/2015 | |
| EP | 3648197 A1 | 5/2020 | |
| KR | 2019007246 A * | 1/2019 | ........ H01M 10/0481 |

OTHER PUBLICATIONS

Adenusi, H. et al., Lithium Batteries and the Solid Electrolyte Interphase (SEI)—Progress and Outlook, Advanced Energy Materials, 2023, 13:2203307, pp. 1-23.
(Continued)

*Primary Examiner* — Sean P Cullen
(74) *Attorney, Agent, or Firm* — Quarles & Brady LLP

(57) ABSTRACT

A system and method are disclosed that can improve the capacity, energy and cycle life of an electrochemical cell by using a structure comprising a piezoelectric material. In one form, the electrochemical cell comprises: an anode having a solid-electrolyte interphase layer formed thereon; a cathode; an electrolyte, wherein at least a portion of the electrolyte is located between the anode and cathode; and a structure comprising a piezoelectric material, the structure contacting at least a portion of the solid-electrolyte interphase layer of the anode. In another form, the electrochemical cell comprises: an anode having a solid-electrolyte interphase layer formed thereon; a cathode; an electrolyte, wherein at least a portion of the electrolyte is located between the anode and cathode; and a structure comprising units distributed in a
(Continued)

matrix, the units comprising a piezoelectric material, the structure contacting at least a portion of the solid-electrolyte interphase layer of the anode.

20 Claims, 8 Drawing Sheets

(51) Int. Cl.
  *H01M 50/414* (2021.01)
  *H01M 50/431* (2021.01)

(58) Field of Classification Search
  USPC .......................... 429/144, 251, 254, 50, 248
  See application file for complete search history.

(56) References Cited

U.S. PATENT DOCUMENTS

| | | |
|---|---|---|
| 2010/0323118 A1 | 12/2010 | Mohanty et al. |
| 2014/0342192 A1 | 11/2014 | Wang et al. |
| 2015/0093628 A1 | 4/2015 | Halalay et al. |
| 2019/0165429 A1* | 5/2019 | Lu .......................... H01M 4/134 |

OTHER PUBLICATIONS

Liu, G. et al., A Model of Concurrent Lithium Dendrite Growth, SEI Growth, SEI Penetration and Regrowth, Journal of the Electrochemical Society, 2017, 164(9):A1826-A1833.

Pinson, M. et al., Theory of SEI Formation in Rechargeable Batteries: Capacity Fade, Accelerated Aging and Lifetime Prediction, Journal of the Electrochemical Society, 2012, 160(2):A243, 29 pages.

European Patent Office, Extended Search Report, Application No. 22856498.5, Jul. 28, 2025, 9 pages.

PCT International Search Report and Written Opinion, PCT/US2022/039824, Nov. 4, 2022, 16 pages.

* cited by examiner

ELECTROCHEMICAL CELL INCLUDING PIEZOELECTRIC STRUCTURE THAT REDUCES SOLID-ELECTROLYTE INTERPHASE LAYER GROWTH ON ELECTRODE, AND METHOD FOR USING THE SAME

CROSS-REFERENCES TO RELATED APPLICATIONS

This application is based on, claims benefit of, and claims priority to U.S. Application No. 63/231,830 filed on Aug. 11, 2021, which is hereby incorporated by reference herein in its entirety for all purposes.

STATEMENT REGARDING FEDERALLY SPONSORED RESEARCH

Not Applicable.

BACKGROUND OF THE INVENTION

1. Field of the Invention

This invention relates to electrochemical devices, such as electrochemical cells comprising a cathode, an anode, and a structure (e.g., a layer or a film) comprising a piezoelectric material. This invention also relates to methods for improving the performance of an electrochemical cell.

2. Description of the Related Art

Current state-of-the-art lithium ion batteries comprise an anode including a lithium host material, a cathode including a lithium host material, a separator material that keeps the anode and the cathode from touching but allows $Li^+$ ions through, and an electrolyte (which is often an organic liquid with lithium salts). During a typical discharge process, lithium ions from the anode are extracted into the electrolyte, and lithium ions in the electrolyte are intercalated into the cathode material. This movement of the ions from anode to cathode is accompanied by the release of electrons which flows in the external circuit. The reverse process occurs during the charging process where lithium ions move from the cathode and intercalate in the anode through the electrolyte.

Lithium metal batteries use lithium metal as the anode material. Lithium metal has been considered the ideal anode material because of its ability to store lightweight lithium in the metallic form without the need for an inactive host material or a conductive scaffold. Lithium can provide a capacity of 3860 mAh/g and the lowest theoretical anode potential, making it an enabling technology for next-generation battery systems including lithium-sulfur and lithium-air.

Cycle life is important in applications of rechargeable batteries. In lithium-ion batteries and lithium metal batteries, capacity fade occurs over thousands of cycles. The most common source of capacity fade in lithium-ion batteries is the loss of lithium to the solid-electrolyte interphase (SEI), which is known to form on the electrodes as a result of lithium interacting with the electrolyte during charging. In the case of lithium-ion batteries, SEI is formed at the anode because typical electrolytes are not stable at the operating potential of the anode during charging. The product of this decomposition forms a solid layer on the surface of the active material of the anode. The SEI acts as an ionic conductor and electronic insulator and evolves to form a complex, multilayer surface coating on the anode. Initially, SEI formation protects the anode against solvent decomposition at large negative voltage, but over time it leads to a gradual capacity fade as the SEI layer thickens and competes with reversible lithium intercalation.

Therefore, there is a need for an improved system and/or method that limits solid-electrolyte interphase growth on the anode and/or cathode from the electrolyte of an electrochemical cell. Such a method and/or system would result in enhanced cell life cycle and performance of electrochemical cells.

SUMMARY OF THE INVENTION

This disclosure provides a system and method that can improve the capacity, energy and cycle life of an electrochemical cell by using a structure (e.g., a layer or a film) comprising a piezoelectric material. The electrochemical cell may act in the form of a battery or other type of energy storage devices. The cell may include a cathode, an anode, an electrolyte, and a structure (e.g., a layer or a film) comprising a piezoelectric material. The structure (e.g., a layer or a film) comprising a piezoelectric material can generate a local electric field across its thickness as a result of an externally applied pressure or force, or as a result of an internal deformation of the electrodes during operation such as electrodeposition, intercalation or Redox reaction. The generated local electric field regulates ion transport, reaction potential or double layer structure at and near the SEI interface between active material and electrolyte. This improves the current density distribution and reduces side reactions in the electrode such as SEI formation and growth. As a result, an electrochemical cell with such a structure (e.g., a layer or a film) comprising a piezoelectric material shows improved capacity, energy, and longer cycle life.

This disclosure provides a system and methods for improving the performance of electrochemical cells by introducing a structure (e.g., a layer or a film) comprising a piezoelectric material this is capable of providing an electric field within the electrochemical cell. The generated electric field affects the inner potential of the electrochemical cell, which affects ion diffusion and transport, reaction potential or double layer structure at and near the interface between active material and electrolyte. This can improve the current density distribution within the cell and can also reduce side reactions in the electrode such as SEI formation and growth. As a result, an electrochemical cell with such a structure (e.g., a layer or a film) comprising a piezoelectric material shows improved capacity, energy, and longer cycle life. The generated electric field is due to that the structure comprising a piezoelectric material undergoes a deformation along the transverse directions or thickness directions, which can be induced by an externally applied pressure or force, or as a result of an internal deformation of the electrodes during charging and discharging processes such as electrodeposition, intercalation or Redox reaction.

This disclosure can be applied in a form for batteries that use metal (e.g., lithium, magnesium, sodium, zinc) electrodes. In addition to other improvements, the structure can reduce anode material loss (e.g. lithium loss) with cycling as a result of reduced SEI formation. The disclosure can be applied to both lithium metal batteries and lithium ion batteries, as well as any other electrochemical cell that includes electrodes that experience pressure or change of volume during charging and discharging cycling. The addition of the structure of the present disclosure to an electrochemical cell may advantageously improve cell performances, cell lifetime and efficiency for an electrochemical cell in which the structure comprising a piezoelectric material is included.

In an aspect, the present disclosure provides an electrochemical cell. The cell comprises an anode, a cathode, an electrolyte, and a structure (e.g., a layer or a film) comprising a piezoelectric material. A portion of the electrolyte is located between the anode and cathode. The structure comprising a piezoelectric material is capable of producing an electric field and at least a portion of the structure is located between the anode and cathode.

In another aspect, the present disclosure provides multiple designing strategies for the structure (e.g., a layer or a film) comprising a piezoelectric material which can generate the electric field. The structure can be a coated layer, or film, or a combination of coated layers and films. The coated layer can be coated on a separator, or the structure comprising a piezoelectric material. Specially manufactured units (which can be particles, particle clusters, etc.) can also be added within the structure to increase the electric field generation ability.

In yet another aspect, the present disclosure provides a battery comprising one or more interconnected electrochemical cells as described herein, wherein the electrochemical cells are connected in a series, in parallel, or a combination thereof. The electrochemical cells described herein may be used for a variety of batteries and other electrochemical energy storage devices. For example, the electrochemical cells may be used in lithium metal anode batteries, such as lithium-sulfur batteries and lithium-air batteries, among others.

In still another aspect, the present disclosure provides an electrochemical cell comprising: an anode having a solid-electrolyte interphase layer formed thereon; a cathode; an electrolyte, wherein at least a portion of the electrolyte is located between the anode and cathode; and a structure comprising a piezoelectric material, the structure contacting at least a portion of the solid-electrolyte interphase layer of the anode, wherein a macroscopic dipole of the structure produces a voltage when the structure is subjected to a force from the anode or the solid-electrolyte interphase layer formed on the anode, and wherein the macroscopic dipole of the structure is oriented relative to the force such that the voltage reduces an overpotential that causes solid-electrolyte interphase layer growth.

In the electrochemical cell, expansion of the anode during cycling of the electrochemical cell produces the force on the structure. In one embodiment of the electrochemical cell, the structure can comprise a separator that prevents electronic conduction between the anode and the cathode and that permits ionic conduction via the electrolyte. In one embodiment of the electrochemical cell, the electrochemical cell comprises a separator that prevents electronic conduction between the anode and the cathode and that permits ionic conduction via the electrolyte, and the structure can comprise a layer of the piezoelectric material, the layer being coated on a surface of the separator. In one embodiment of the electrochemical cell, the electrochemical cell comprises a separator that prevents electronic conduction between the anode and the cathode and that permits ionic conduction via the electrolyte, the separator comprising a second piezoelectric material, and the structure can comprise a layer of the piezoelectric material, wherein the layer is coated on a surface of the separator.

In one embodiment of the electrochemical cell, the electrochemical cell comprises a separator that prevents electronic conduction between the anode and the cathode and that permits ionic conduction via the electrolyte, wherein the structure can comprise a layer of the piezoelectric material, the layer being coated on a first surface of the separator, the layer contacting the solid-electrolyte interphase layer formed on the anode, and wherein the electrochemical cell further comprises a second structure comprising a second layer comprising a second piezoelectric material, the second layer being coated on a second surface of the separator, the second layer contacting a second solid-electrolyte interphase layer formed on the cathode.

In one embodiment of the electrochemical cell, the electrochemical cell comprises a separator that prevents electronic conduction between the anode and the cathode and that permits ionic conduction via the electrolyte, the separator comprising a third piezoelectric material, and the structure can comprise a layer of the piezoelectric material, the layer being coated on a first surface of the separator, the layer contacting the solid-electrolyte interphase layer formed on the anode, and the electrochemical cell further comprises a second structure comprising a second layer comprising a second piezoelectric material, the second layer being coated on a second surface of the separator, the second layer contacting a second solid-electrolyte interphase layer formed on the cathode.

In any embodiments of the electrochemical cell, the piezoelectric material can be selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyvinylidene fluoride, polyamides, liquid-crystalline polymers, polyureas, polyacrylonitrile, polyvinylidene chloride, polyvinyl acetate, polyphenylethernitrile, nylons, poly(vinylidene cyanide-vinylacetate), poly(1-bicyclobutanecarbonitrile), poly(vinylidene fluoride-trifluoroethylene), poly(vinylidene fluoride-tetrafluoroethylene), copolymers of these materials, or composites of these materials. In any embodiments of the electrochemical cell, the piezoelectric material can comprise poled polyvinylidene fluoride.

In embodiments of the electrochemical cell, the second piezoelectric material can be selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyvinylidene fluoride, polyamides, liquid-crystalline polymers, polyureas, polyacrylonitrile, polyvinylidene chloride, polyvinyl acetate, polyphenylethernitrile, nylons, poly(vinylidene cyanide-vinylacetate), poly(1-bicyclobutanecarbonitrile), poly(vinylidene fluoride-trifluoroethylene), poly(vinylidene fluoride-tetrafluoroethylene), copolymers of these materials, or composites of these materials. In embodiments of the electrochemical cell, the piezoelectric material can comprise poled polyvinylidene fluoride.

In embodiments of the electrochemical cell, the third piezoelectric material can be selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyvinylidene fluoride, polyamides, liquid-crystalline polymers, polyureas, polyacrylonitrile, polyvinylidene chloride, polyvinyl acetate, polyphenylethernitrile, nylons, poly(vinylidene cyanide-vinylacetate), poly(1-bicyclobutanecarbonitrile), poly(vinylidene fluoride-trifluoroethylene), poly(vinylidene fluoride-tetrafluoroethylene), copolymers of these materials, or composites of these materials. In embodiments of the electrochemical cell, the third piezoelectric material can comprise poled polyvinylidene fluoride.

In embodiments of the electrochemical cell, the anode is a solid metal selected from the group consisting of sodium, magnesium, zinc, and lithium.

In embodiments of the electrochemical cell, the electrochemical cell is a lithium-ion cell and the anode is selected from the group consisting of graphite, activated carbon, carbon black, lithium titanate, graphene, tin-cobalt alloys, and silicone.

In embodiments of the electrochemical cell, the cathode can comprise a lithium host material selected from lithium metal oxides wherein the metal is one or more of aluminum, cobalt, iron, manganese, nickel, vanadium, and lithium-containing phosphates having a general formula $LiMPO_4$, wherein M is one or more of cobalt, iron, manganese, and nickel.

In embodiments of the electrochemical cell, the electrolyte is a liquid electrolyte comprising a lithium compound in an organic solvent. In embodiments of the electrochemical cell, the electrolyte is a solid-state electrolyte comprising a material selected from the group consisting of substituted or unsubstituted lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

In embodiments of the electrochemical cell, the piezoelectric material can have a piezoelectric coefficient of at least 4 pC/N. In embodiments of the electrochemical cell, the layer of the piezoelectric material can have a thickness between 0.01 and 500 micrometers.

In embodiments of the electrochemical cell, the voltage produced is confined to within about 100 nanometers or within about 100 micrometers of a surface of the anode. In embodiments of the electrochemical cell, the voltage produced has a magnitude of at least 0.1 microvolts. In embodiments of the electrochemical cell, the voltage produced has a magnitude of at least 1 millivolt.

In embodiments of the electrochemical cell, the electrochemical cell exhibits a capacity promotion of at least 10% compared to an otherwise identical electrochemical cell not including the structure. In embodiments of the electrochemical cell, the electrochemical cell exhibits an energy promotion of at least 20% compared to an otherwise identical electrochemical cell not including the structure.

In the electrochemical cell, at least one additional layer is in contact with the layer of the piezoelectric material, wherein the at least one additional layer has at least one improved material property over the layer of the piezoelectric material, wherein the material property is selected from the group consisting of Young's modulus, flexural modulus, impact strength, tensile strength, flexural strength, Rockwell hardness, and elongation at break.

In embodiments of the electrochemical cell, the at least one additional layer is formed of at least one material selected from carbon, layered materials, metal carbides, non-metal carbides, metal nitrides, non-metal nitrides, metal silicides, non-metal silicides, and metal alloys.

In embodiments of the electrochemical cell, a surface of the layer of the piezoelectric material is treated in a manner that changes at least one surface property, wherein the surface properties are selected from a group consisting of roughness, hydrophilicity, surface charge, surface energy, biocompatibility, permeability, and reactivity.

In embodiments of the electrochemical cell, the structure can have a solid volume fraction of 0.3 to 0.7. In embodiments of the electrochemical cell, the structure undergoes a deformation along a thickness direction due to volume change associated with electrodeposition on the anode.

In yet another aspect, the present disclosure provides an electrochemical cell comprising: an anode having a solid-electrolyte interphase layer formed thereon; a cathode; an electrolyte, wherein at least a portion of the electrolyte is located between the anode and cathode; and a structure comprising units distributed in a matrix, the units comprising a piezoelectric material, the structure contacting at least a portion of the solid-electrolyte interphase layer of the anode, wherein a macroscopic dipole of the structure produces a voltage when the structure is subjected to a force from the anode or the solid-electrolyte interphase layer formed on the anode, and wherein the macroscopic dipole of the structure is oriented relative to the force such that the voltage reduces an overpotential that causes solid-electrolyte interphase layer growth.

In embodiments of the electrochemical cell, the matrix can comprise a separator material that prevents electronic conduction between the anode and the cathode and that permits ionic conduction via the electrolyte. In embodiments of the electrochemical cell, the matrix can comprise a second piezoelectric material, and the matrix prevents electronic conduction between the anode and the cathode and permits ionic conduction via the electrolyte.

In embodiments of the electrochemical cell, the matrix can comprise a separator material that prevents electronic conduction between the anode and the cathode and that permits ionic conduction via the electrolyte, and the structure can comprise a layer of a second piezoelectric material, the layer of the second piezoelectric material being coated on a first surface of the structure, the layer of the second piezoelectric material contacting the solid-electrolyte interphase layer formed on the anode.

In embodiments of the electrochemical cell, the matrix can comprise a second piezoelectric material, the matrix prevents electronic conduction between the anode and the cathode and permits ionic conduction via the electrolyte, and the structure can comprise a layer of a third piezoelectric material, the layer of the third piezoelectric material being coated on a first surface of the structure, the layer of the third piezoelectric material contacting the solid-electrolyte interphase layer formed on the anode.

In embodiments of the electrochemical cell, the matrix can comprise a separator material that prevents electronic conduction between the anode and the cathode and that permits ionic conduction via the electrolyte, the structure can comprise a first layer of a second piezoelectric material, the first layer of the second piezoelectric material being coated on a first surface of the structure, the first layer of the second piezoelectric material contacting the solid-electrolyte interphase layer formed on the anode, and the structure can comprise a second layer of a third piezoelectric material, the second layer of the third piezoelectric material being coated on a second surface of the structure, the second layer of the third piezoelectric material contacting a solid-electrolyte interphase layer formed on the cathode.

In embodiments of the electrochemical cell, the matrix can comprise a second piezoelectric material, the matrix prevents electronic conduction between the anode and the cathode and permits ionic conduction via the electrolyte, the structure can comprise a first layer of a third piezoelectric material, the first layer of the third piezoelectric material being coated on a first surface of the structure, the first layer of the third piezoelectric material contacting the solid-electrolyte interphase layer formed on the anode, and the structure can comprise a second layer of a fourth piezoelectric material, the second layer of the fourth piezoelectric material being coated on a second surface of the structure, the second layer of the fourth piezoelectric material contacting a solid-electrolyte interphase layer formed on the cathode. Expansion of the anode during cycling of the electrochemical cell can produce the force on the structure.

In embodiments of the electrochemical cell, the units comprise particles having a particle size between 0.1 and 10 micrometers. In embodiments of the electrochemical cell, the separator material is a permeable polymer. In embodiments of the electrochemical cell, the separator material can comprise a polyolefin.

In embodiments of the electrochemical cell, the piezoelectric material can be selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyvinylidene fluoride, polyamides, liquid-crystalline polymers, polyureas, polyacrylonitrile, polyvinylidene chloride, polyvinyl acetate, polyphenylethernitrile, nylons, poly(vinylidene cyanide-vinylacetate), poly(1-bicyclobutanecarbonitrile), poly(vinylidene fluoride-trifluoroethylene), poly(vinylidene fluoride-tetrafluoroethylene), copolymers of these materials, or composites of these materials. In embodiments of the electrochemical cell, the piezoelectric material can comprise poled polyvinylidene fluoride.

In embodiments of the electrochemical cell, the second piezoelectric material can be selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyvinylidene fluoride, polyamides, liquid-crystalline polymers, polyureas, polyacrylonitrile, polyvinylidene chloride, polyvinyl acetate, polyphenylethernitrile, nylons, poly(vinylidene cyanide-vinylacetate), poly(1-bicyclobutanecarbonitrile), poly(vinylidene fluoride-trifluoroethylene), poly(vinylidene fluoride-tetrafluoroethylene), copolymers of these materials, or composites of these materials. In embodiments of the electrochemical cell, the piezoelectric material can comprise poled polyvinylidene fluoride.

In embodiments of the electrochemical cell, the third piezoelectric material can be selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyvinylidene fluoride, polyamides, liquid-crystalline polymers, polyureas, polyacrylonitrile, polyvinylidene chloride, polyvinyl acetate, polyphenylethernitrile, nylons, poly(vinylidene cyanide-vinylacetate), poly(1-bicyclobutanecarbonitrile), poly(vinylidene fluoride-trifluoroethylene), poly(vinylidene fluoride-tetrafluoroethylene), copolymers of these materials, or composites of these materials. In embodiments of the electrochemical cell, the third piezoelectric material can comprise poled polyvinylidene fluoride.

In embodiments of the electrochemical cell, the anode is a solid metal selected from the group consisting of sodium, magnesium, zinc, and lithium.

In embodiments of the electrochemical cell, the electrochemical cell is a lithium-ion cell and the anode is selected from the group consisting of graphite, activated carbon, carbon black, lithium titanate, graphene, tin-cobalt alloys, and silicone.

In embodiments of the electrochemical cell, the cathode can comprise a lithium host material selected from lithium metal oxides wherein the metal is one or more of aluminum, cobalt, iron, manganese, nickel, vanadium, and lithium-containing phosphates having a general formula $LiMPO_4$, wherein M is one or more of cobalt, iron, manganese, and nickel.

In embodiments of the electrochemical cell, the electrolyte is a liquid electrolyte comprising a lithium compound in an organic solvent. In embodiments of the electrochemical cell, the electrolyte is a solid-state electrolyte comprising a material selected from the group consisting of substituted or unsubstituted lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

In embodiments of the electrochemical cell, the piezoelectric material can have a piezoelectric coefficient of at least 4 pC/N. In embodiments of the electrochemical cell, the layer of the second piezoelectric material can have a thickness between 0.01 and 500 micrometers. In embodiments of the electrochemical cell, the layer of the third piezoelectric material can have a thickness between 0.01 and 500 micrometers. In embodiments of the electrochemical cell, the first layer of the second piezoelectric material and the second layer of the third piezoelectric material each can have a thickness between 0.01 and 500 micrometers. In embodiments of the electrochemical cell, the first layer of a third piezoelectric material and the second layer of the fourth piezoelectric material each can have a thickness between 0.01 and 500 micrometers.

In embodiments of the electrochemical cell, the voltage produced is confined to within about 100 nanometers or within about 100 micrometers of a surface of the anode. In embodiments of the electrochemical cell, the voltage produced has a magnitude of at least 0.1 microvolts. In embodiments of the electrochemical cell, the voltage produced has a magnitude of at least 1 millivolt.

In embodiments of the electrochemical cell, the electrochemical cell can exhibit a capacity promotion of at least 10% compared to an otherwise identical electrochemical cell not including the structure. In embodiments of the electrochemical cell, the electrochemical cell can exhibit an energy promotion of at least 20% compared to an otherwise identical electrochemical cell not including the structure.

In the electrochemical cell, at least one additional layer can be in contact with the layer of the second piezoelectric material, wherein the at least one additional layer has at least one improved material property over the layer of the piezoelectric material, wherein the material property is selected from the group consisting of Young's modulus, flexural modulus, impact strength, tensile strength, flexural strength, Rockwell hardness, and elongation at break.

In the electrochemical cell, at least one additional layer can be in contact with the layer of the third piezoelectric material, wherein the at least one additional layer has at least one improved material property over the layer of the piezoelectric material, wherein the material property is selected from the group consisting of Young's modulus, flexural modulus, impact strength, tensile strength, flexural strength, Rockwell hardness, and elongation at break.

In the electrochemical cell, at least one additional layer can be in contact with the first layer of the second piezoelectric material, wherein the at least one additional layer has at least one improved material property over the layer of the piezoelectric material, wherein the material property is selected from the group consisting of Young's modulus, flexural modulus, impact strength, tensile strength, flexural strength, Rockwell hardness, and elongation at break.

In the electrochemical cell, at least one additional layer can be in contact with the first layer of the third piezoelectric material, wherein the at least one additional layer has at least one improved material property over the layer of the piezoelectric material, wherein the material property is selected from the group consisting of Young's modulus, flexural modulus, impact strength, tensile strength, flexural strength, Rockwell hardness, and elongation at break.

In embodiments of the electrochemical cell, the at least one additional layer can be formed of at least one material selected from carbon, layered materials, metal carbides, non-metal carbides, metal nitrides, non-metal nitrides, metal silicides, non-metal silicides, and metal alloys. In embodiments of the electrochemical cell, the structure undergoes a deformation along a thickness direction due to volume change associated with electrodeposition on the anode.

In still another aspect, the present disclosure provides a method for reducing solid-electrolyte interphase layer growth in an electrochemical cell having an anode, a cathode, and an electrolyte located between the anode and the cathode. The method comprises: (a) contacting at least a portion of a solid-electrolyte interphase layer formed on one of the anode or the cathode with a structure comprising a piezoelectric material, wherein a macroscopic dipole of the structure produces a voltage when the structure is subjected to a force from the anode or the solid-electrolyte interphase layer formed on the anode, and wherein the macroscopic dipole of the structure is oriented relative to the force such that the voltage reduces an overpotential that causes solid-electrolyte interphase layer growth.

In embodiments of the method, the structure can comprise a separator that prevents electronic conduction between the anode and the cathode and that permits ionic conduction via the electrolyte. In embodiments of the method, the electrochemical cell can comprise a separator that prevents electronic conduction between the anode and the cathode and that permits ionic conduction via the electrolyte, and the structure can comprise a layer of the piezoelectric material, the layer being coated on a surface of the separator.

In embodiments of the method, the electrochemical cell can comprise a separator that prevents electronic conduction between the anode and the cathode and that permits ionic conduction via the electrolyte, the separator comprising a second piezoelectric material, and the structure can comprise a layer of the piezoelectric material, the layer being coated on a surface of the separator.

In embodiments of the method, the electrochemical cell can comprise a separator that prevents electronic conduction between the anode and the cathode and that permits ionic conduction via the electrolyte, the structure can comprise a layer of the piezoelectric material, the layer being coated on a first surface of the separator, the layer contacting the solid-electrolyte interphase layer formed on the anode, and the electrochemical cell can further comprise a second structure comprising a second layer comprising a second piezoelectric material, the second layer being coated on a second surface of the separator, the second layer contacting a second solid-electrolyte interphase layer formed on the cathode.

In embodiments of the method, the electrochemical cell can comprise a separator that prevents electronic conduction between the anode and the cathode and that permits ionic conduction via the electrolyte, the separator comprising a third piezoelectric material, and the structure can comprise a layer of the piezoelectric material, the layer being coated on a first surface of the separator, the layer contacting the solid-electrolyte interphase layer formed on the anode, and the electrochemical cell can further comprise a second structure comprising a second layer comprising a second piezoelectric material, the second layer being coated on a second surface of the separator, the second layer contacting a second solid-electrolyte interphase layer formed on the cathode.

In embodiments of the method, the structure can comprise units distributed in a matrix, the units comprising the piezoelectric material, the structure contacting at least a portion of the solid-electrolyte interphase layer of the anode.

In embodiments of the method, the matrix can comprise a separator material that prevents electronic conduction between the anode and the cathode and that permits ionic conduction via the electrolyte. In embodiments of the method, the matrix can comprise a second piezoelectric material, and the matrix prevents electronic conduction between the anode and the cathode and permits ionic conduction via the electrolyte.

In embodiments of the method, the matrix can comprise a separator material that prevents electronic conduction between the anode and the cathode and that permits ionic conduction via the electrolyte, and the structure can comprise a layer of a second piezoelectric material, the layer of the second piezoelectric material being coated on a first surface of the structure, the layer of the second piezoelectric material contacting the solid-electrolyte interphase layer formed on the anode.

In the method, the matrix can comprise a second piezoelectric material, the matrix prevents electronic conduction between the anode and the cathode and permits ionic conduction via the electrolyte, and the structure can comprise a layer of a third piezoelectric material, the layer of the third piezoelectric material being coated on a first surface of the structure, the layer of the third piezoelectric material contacting the solid-electrolyte interphase layer formed on the anode.

In embodiments of the method, the matrix can comprise a separator material that prevents electronic conduction between the anode and the cathode and that permits ionic conduction via the electrolyte, the structure can comprise a first layer of a second piezoelectric material, the first layer of the second piezoelectric material being coated on a first surface of the structure, the first layer of the second piezoelectric material contacting the solid-electrolyte interphase layer formed on the anode, and the structure can comprise a second layer of a third piezoelectric material, the second layer of the third piezoelectric material being coated on a second surface of the structure, the second layer of the third piezoelectric material contacting a solid-electrolyte interphase layer formed on the cathode.

In embodiments of the electrochemical cell, the matrix can comprise a second piezoelectric material, the matrix prevents electronic conduction between the anode and the cathode and permits ionic conduction via the electrolyte, the structure can comprise a first layer of a third piezoelectric material, the first layer of the third piezoelectric material being coated on a first surface of the structure, the first layer of the third piezoelectric material contacting the solid-electrolyte interphase layer formed on the anode, and the structure can comprise a second layer of a fourth piezoelectric material, the second layer of the fourth piezoelectric material being coated on a second surface of the structure, the second layer of the fourth piezoelectric material contacting a solid-electrolyte interphase layer formed on the cathode.

Additionally, the system and method involving the structure comprising a piezoelectric material may be utilized on a variety of battery chemistries and even optimized for each specific electrode and electrolyte combination.

These and other features, aspects, and advantages of the present disclosure will become better understood upon consideration of the following detailed description, drawings, and appended claims.

DETAILED DESCRIPTION OF THE INVENTION

Figure 1:
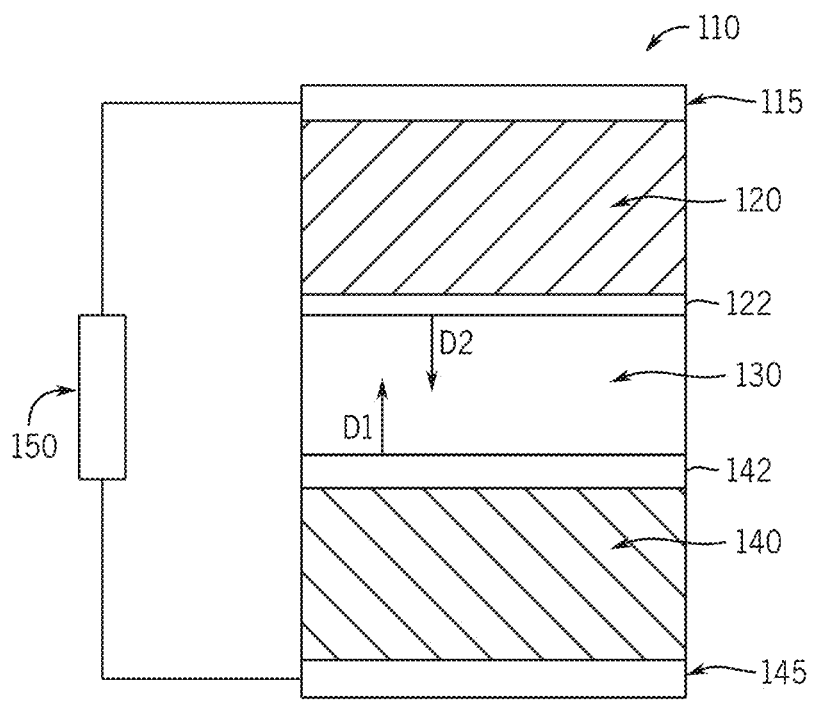
FIG. 1 is a schematic of one embodiment according to the invention of an electrochemical cell comprising a cathode, an anode, an electrolyte, and a structure comprising a piezoelectric material. The structure is a bulk piezoelectric separator with a specific porosity. The structure is between the cathode and the anode.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, a "cell" or "electrochemical cell" is a basic electrochemical unit that includes the electrodes and an electrolyte. A "battery" is one or more cells or cell assemblies which are ready for use, as it often includes an appropriate housing, electrical interconnections, and possibly electronics to control and protect the cells from failure.

As used herein, "electrochemical cells" are contemplated as being rechargeable cells, also referred to as secondary cells, unless the context clearly dictates otherwise. The "anode" is defined as the electrode that undergoes oxidation, therefore losing electrons, during discharge. The "cathode" is defined as the electrode that undergoes reduction, therefore gaining electrons, during discharge. These electrochemical roles are reversed during the charging process, but the "anode" and "cathode" electrode designations remain the same.

As used herein, "piezoelectric" materials are defined as materials capable of generating an electric charge that accumulates in response to applied mechanical stress.

In an aspect, the present disclosure provides an electrochemical cell. The cell comprises an anode, a cathode, an electrolyte, and a structure comprising a piezoelectric material. A portion of the electrolyte is located between the anode and cathode. The structure (e.g., a layer or a film) comprising a piezoelectric material is capable of producing a voltage and at least a portion of the structure is located between the anode and cathode.

The voltage generated by the structure comprising a piezoelectric material may be produced by the piezoelectric effect. The voltage may be the electric potential difference between one specific location on the structure and another specific location on the structure, or the whole region of the structure. The voltage may also be the electric potential difference between the specific location or region on the structure and some other reference point, such as the anode. The voltage may be positive or negative with respect to the reference point. The structure may comprise at least one of a ceramic piezoelectric film or a polymeric piezoelectric film. The structure may comprise a piezoelectric material selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyamides, liquid-crystalline polymers, polyureas, polyacrylonitrile, polyvinylidene chloride, polyvinyl acetate, polyphenylethernitrile, nylons, poly(I-bicyclobutanecarbonitrile), poly(vinylidene cyanide-vinylacetate), poly(vinylidene fluoride trifluoroethylene), poly(vinylidene fluoridetetrafluoroethylene), copolymers of these materials, or composites of these materials. For example, the structure may comprise polyvinylidene fluoride or a combination of polyvinylidene fluoride and barium titanate. The polyvinylidene fluoride may be poled polyvinylidene fluoride.

The electrochemical cell may include a first layer comprising a piezoelectric material and at least one additional layer coupled to the first layer. The at least one additional layer may have at least one improved material property over the first layer. The material properties may be selected from the group consisting of density, Young's modulus, flexural modulus, impact strength, tensile strength, flexural strength, Rockwell hardness, and elongation at break. The at least one additional layer may be formed of at least one material selected from carbon, layered materials, metal carbides, non-metal carbides, metal nitrides, non-metal nitrides, metal silicides, non-metal silicides, polymers, and metal alloys.

A portion of the structure comprising a piezoelectric material may be located between the anode and the cathode in the electrochemical cell. The structure may be configured as a barrier to separate the anode from the electrolyte or the cathode. The structure may be a layer not directly attached to a surface of the anode but one that is placed on the anode surface during assembly of the electrochemical device. The structure may be a specially treated separator (which can be regarded as a film) by itself that separates the anode and the cathode. The structure may be a layer coated on one or two surfaces of a separator, or a specially treated layer coated on one or two surfaces of a specially treated separator. When the structure is in the form of a layer, it may have a thickness between 0.01 and 500 micrometers, between 1 and 100 micrometers, between 15 and 25 micrometers, or between 19 and 21 micrometers. When the structure is in the form of a film, it may have a thickness between 0.1 and 500 micrometers, between 1 and 100 micrometers, between 15 and 25 micrometers, or between 19 and 21 micrometers. Specially treated units can be added into the film to increase the performance of the structure. The units can be in the form of particles or particle clusters, with a particle size between 0.1 and 10 micrometers.

The structure comprising a piezoelectric material within the electrochemical cell may be selectively permeable. The structure, including the coated layer, and/or film, and/or units, may be selectively permeable to lithium ions. The structure may be formed of a material and/or multiple materials having a piezoelectric coefficient (d33 and/or d31) of at least 0.1 pC/N, of at least 1 pC/N, of at least 3 pC/N, of at least 4 pC/N, of at least 5 pC/N, of at least 7 pC/N, of at least 10 pC/N, of at least 15 pC/N, of at least 20 pC/N, of at least 25 pC/N, of at least 50 pC/N, of at least 75 pC/N, of at least 100 pC/N, of at least 150 pC/N, of at least 200 pC/N, of at least 250 pC/N, of at least 300 pC/N, of at least 350 pC/N, of at least 400 pC/N, of at least 450 pC/N, of at least 500 pC/N, or some other values in-between. The various values of piezoelectric coefficients can be pre-designed, and achieved by polarization during the manufacturing process.

The structure comprising a piezoelectric material within the electrochemical cell may produce a voltage when subjected to a force. The voltage may be produced on the anode side, on the cathode side, or throughout the structure (which can be regarded as an electric field), or their combinations. A protrusion from the metallic anode can be generated due to non-uniform ionic electrodeposition process, which may produce the force to cause the deformation of the structure. The deformation can be magnified though an interlayer pre-pressure generated by an external force during the manufacturing of electrochemical cells. The protrusion may be a lithium dendrite. The protrusion may also be a dendrite formed of another common anode metal such as sodium, magnesium, or zinc. During cycling, the ionic intercalation and deintercalation or the redox reactions can cause the volume of the electrodes (which can be a metallic electrode or a porous electrode composed of active particles), which may produce the force on the structure comprising a piezoelectric material and create a deformation. The deformation can be magnified though an interlayer pre-pressure generated by an external force during the manufacturing of electrochemical cells. The voltage produced may be primarily confined to within about 100, 10, 5, 4, 3, 2, 1, or 0.1 nanometers of the electrode surface. The electric field produced may be also confined to within about 100, 50, 40, 30, 20, 10, 5, or 1 micrometers of the electrode surface. The voltage produced may be confined to the region of the protrusion, or/and the surface of the electrodes, or/and within the whole structure region. The magnitude of the voltage produced may be correlated to the magnitude of the force. This correlation may be positive. For example, as the magnitude of the force is increased, the structure comprising a piezoelectric material may produce a subsequently increased voltage. The voltage produced may have a magnitude of at least 0.1, 1, 3, 5, 7, 10, 20, 30, 40, 50, 60, 70, 80, 90, 100, 125, 150, 175, 200, 225, 250, 300, 400, 500, 600, 700, 800, or 900 micro-volts, 1, 10, 100, or 500 millivolts, 1, 10, or 100 volts or greater.

The surface of the structure comprising a piezoelectric material can be treated in a manner that changes at least one surface property, wherein the surface properties are selected from a group consisting of roughness, hydrophilicity, surface charge, surface energy, biocompatibility, permeability, and reactivity. Other surface properties may also be adjusted. The structure may comprise a plasma treated non-piezoelectric polymer, wherein the treatment generates surface charges. The structure may specifically be plasma treated piezoelectric polymer such as polyvinylidene fluoride, where the combined piezoelectric and surface charge effects may work together to increase the performances of the electrochemical cell.

The anode of the electrochemical cell may be a solid metal. The anode may be at least one of sodium, magnesium, zinc, or lithium. The anode may be lithium metal. Alternatively, the electrochemical cell may be a lithium-ion cell and the anode may comprise a lithium host material selected from the group consisting of graphite, activated carbon, carbon black, lithium titanate, graphene, tin-cobalt alloys, and silicon.

The cathode of the electrochemical cell may comprise a lithium host material. The lithium host material may be selected from lithium metal oxides wherein the metal is one or more of aluminum, cobalt, iron, manganese, nickel, vanadium, and lithium-containing phosphates having a general formula $LiMPO_4$, wherein M is one or more of cobalt, iron, manganese, and nickel. The lithium host material may be selected from the group consisting of lithium cobalt oxide, lithium nickel manganese cobalt oxide, and lithium manganese oxide. The cathode may comprise sulfur. The cathode may comprise an air electrode.

The electrolyte may be a liquid electrolyte. The liquid electrolyte of the electrochemical cell may comprise a lithium compound in an organic solvent. The lithium compound may be selected from $LiPF_6$, $LiBF_4$, $LiClO_4$, lithium bis (fluorosulfonyl)imide (LiFSI), $LiN(CF_3SO_2)_2$, (LiTFSI), and $LiCF_2SO_3$ (LiTf). The organic solvent may be selected from carbonate based solvents, ether based solvents, ionic liquids, and mixtures thereof. The carbonate based solvent may be selected from the group consisting of dimethyl carbonate, diethyl carbonate, ethylmethyl carbonate, dipropyl carbonate, methylpropyl carbonate, ethylpropyl carbonate, methylethyl carbonate, ethylene carbonate, propylene carbonate, and butylene carbonate; and the ether based solvent is selected from the group consisting of diethylether, dibutylether, monoglyme, diglyme, tetraglyme, 2-methyltetrahydrofuran, tetrahydrofuran, 1,3 dioxolane, 1,2-dimethoxyethane, and 1,4-dioxane. The electrochemical cell may also comprise a separator located between the anode and the cathode. The separator may be a permeable polymer. The separator may have a solid volume fraction of 0.3 to 0.7, or 0.4 to 0.6.

The electrolyte may be a solid-state electrolyte. The solid electrolyte material may comprise a material selected from the group consisting of substituted or unsubstituted lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

The electrochemical cell may further comprise a battery management system including a controller in electrical communication with the structure comprising a piezoelectric material. The controller is configured to execute a program stored in the controller to monitor the voltage produced by the structure comprising a piezoelectric material to monitor the volume expansion of the anode and the cathode.

The electrochemical cell may further comprise at least one current collector in contact with at least one of the anode or cathode. The current collector may comprise a suitable metallic material such as aluminum, copper, silver, iron, gold, nickel, cobalt, titanium, molybdenum, steel, zirconium, tantalum, and stainless steel. The anode and cathode may be connected to an electrical component through a circuit.

In another aspect, the present disclosure provides a method of increasing the performances, such as capacity, energy, and cycle life, of electrochemical cells. The method comprises arranging a structure comprising a piezoelectric material between the anode and the cathode, generating a voltage in an area or domain within the electrochemical cell and affecting the inner potential of the electrochemical cell, which regulates ion transport, reaction potential or double layer structure at and near the SEI interface between active material and electrolyte. This improves the current density distribution and can also reduce side reactions in the electrode such as SEI formation and growth.

The voltage generated in the structure comprising a piezoelectric material described in the method may be produced by the piezoelectric effect. The voltage may be generated by the electrodeposited metal pushing on the area of the structure in an orthogonal direction. The voltage may be generated by the stretching of the structure comprising a piezoelectric material due to the protrusion's evolution. The voltage may be generated by the compression of the structure due to the electrode volume changing, which can be generated by the ionic intercalation/deintercalation or the redox reaction, during the cycling process.

In yet another aspect, the present disclosure provides a battery comprising one or more interconnected electrochemical cells as described herein, wherein the electrochemical cells are connected in a series, in parallel, or a combination thereof. The electrochemical cells described herein may be used for a variety of batteries and other electrochemical energy storage devices. For example, the electrochemical cells may be used in lithium metal anode batteries, such as lithium-sulfur batteries and lithium-air batteries, among others.

Batteries comprising one or more of the electrochemical cells of the present disclosure may exhibit a capacity and energy promotion of at least about 10%, at least about 20%, at least about 30%, at least about 50%, and up to about 90% or more at a current density of about 0.1 mA/cm$^2$, 0.25 mA/cm$^2$, 0.5 mA/cm$^2$, 2 mA/cm$^2$, 5 mA/cm$^2$, 10 mA/cm$^2$, or another current density value compared to an electrochemical cell not including the structure comprising a piezoelectric material. This capacity and energy promotion may be an initial or a maximum promotion or one that is averaged over a certain number of cycles, such as 100, 200, 300, 400, 500, 1000, 5000, or 10000 cycles. The capacity and energy promotion may be retained at any of the promotion amounts listed above at any current density listed above for any number of cycles listed above.

The structure (e.g., a layer or a film) comprising a piezoelectric material described in the present disclosure may be combined with other materials or methods to promote the electrochemical cell performances. For example, the structure comprising a piezoelectric material may be coupled to a physical barrier or used with specific electrolyte solutions or charge generating methods.

FIG. 1 illustrates a designing strategy of coupling a structure comprising a piezoelectric material into a non-limiting example electrochemical cell 110. The electrochemical cell 110 includes a cathode 120, an anode 140, and a structure comprising a piezoelectric material in the form of a bulk piezoelectric separator 130 with a specific porosity. The bulk piezoelectric separator 130 is between the cathode 120, which is in contact with the current collector 115, and the anode 140, which is in contact with the current collector 145. The cathode 120 has a solid-electrolyte interphase layer 122 formed thereon, and the anode 140 has a solid-electrolyte interphase layer 142 formed thereon. The current collectors 115, 145 of the electrochemical cell 110 may be in electrical communication with an electrical component 150. The electrical component 150 could place the electrochemical cell 110 in electrical communication with an electrical load that discharges the battery or a charger that charges the battery. The surface of the bulk piezoelectric separator 130 is in contact with the surface of the solid-electrolyte interphase layer 122 on the cathode 120, and the surface of the bulk piezoelectric separator 130 is in contact with the surface of the solid-electrolyte interphase layer 142 on the anode 140. At least a portion of an amount of electrolyte is arranged between the cathode 120 and the anode 140.

A suitable active material for the cathode 120 of the electrochemical cell 110 is one or more of the lithium host materials described above, or porous carbon (for a lithium air battery), or a sulfur containing material (for a lithium sulfur battery). The lithium host materials may be selected from lithium metal oxides wherein the metal is one or more of aluminum, cobalt, iron, manganese, nickel, vanadium, lithium-containing phosphates having a general formula LiMPO$_4$, wherein M is one or more of cobalt, iron, manganese, and nickel. In one embodiment, the lithium host material is selected from lithium cobalt oxide, lithium nickel manganese cobalt oxide, and lithium manganese oxide.

A suitable active material for the anode 140 of the electrochemical cell 110 is lithium metal. However, other batteries suitable for use in the system and methods of the present disclosure include a metal electrode comprising a metal selected from magnesium, sodium, and zinc, or a porous electrode with active materials such as graphite, silicon, etc. Besides, the suitable material for the anode of the electrochemical cell can also be the lithium host materials described above, or porous carbon, porous silicon which are able to undergo large volume change during charging and discharging cyclings, etc.

An example electrolyte of the electrochemical cell 110 comprises a lithium compound in an organic solvent. The lithium compound may be selected from LiPF$_6$, LiBF$_4$, LiClO$_4$, lithium bis (fluorosulfonyl)imide (LiFSI), LiN(CF$_2$SO$_2$)$_2$ (LiTFSI), and LiCF$_2$SO$_3$ (LiTf). The organic solvent may be selected from carbonate based solvents, ether based solvents, ionic liquids, and mixtures thereof. The carbonate based solvent may be selected from the group consisting of dimethyl carbonate, diethyl carbonate, ethylmethyl carbonate, dipropyl carbonate, methylpropyl carbonate, ethylpropyl carbonate, methylethyl carbonate, ethylene carbonate, propylene carbonate, and butylene carbonate; and the ether based solvent may be selected from the group consisting of diethylether, dibutylether, monoglyme, diglyme, tetraglyme, 2-methyltetrahydrofuran, tetrahydrofuran, 1,3-dioxolane, 1,2-dimethoxyethane, and 1,4-dioxane.

During normal operation, the principal functions of the separator 130 are to prevent electronic conduction (i.e., shorts or direct contact) between the anode 140 and cathode 120 while permitting ionic conduction via the electrolyte. A suitable material for the separator 130 of the electrochemical cell 110 is a polyolefin such as porous polypropylene, porous polyethylene, or blends or layers thereof.

Alternatively, the separator 130 and the liquid electrolyte of the electrochemical cell 110 may be replaced with a solid electrolyte material. In non-limiting example solid electrolyte materials, the solid electrolyte material comprises a material selected from the group consisting of substituted or unsubstituted lithium lanthanum zirconium oxides (LLZO), $Li_{10}GeP_2S_{12}$ (LGPS), $Li_{0.33}La_{0.56}TiO_3$(LLTO), $Li_2PO_2N$ (LiPON), and lithium polysulfides (LiPS).

During cycling, the ionic intercalation and deintercalation take place in the electrodes within the electrochemical cell, which changes the volume of the electrodes and creates a deformation of the piezoelectric separator 130 along the thickness directions D1, D2. This deformation will create a piezoelectric voltage across the thickness directions D1, D2 of the piezoelectric separator 130, which changes the potential within the electrochemical cell 110 and the ionic transport and can improve the performance of the electrochemical cell 110. When the electrochemical cell 110 is with a metal anode 140, the combination of the ionic electrodeposition and the ionic intercalation/deintercalation in the counter porous electrode during cycling can cause a deformation of the piezoelectric separator 130 along the thickness directions D1, D2, which creates a voltage along the thickness directions D1, D2 of the piezoelectric separator 130. This generated voltage can affect the ion transport and the performances of the electrochemical cell 110.

Figure 2:
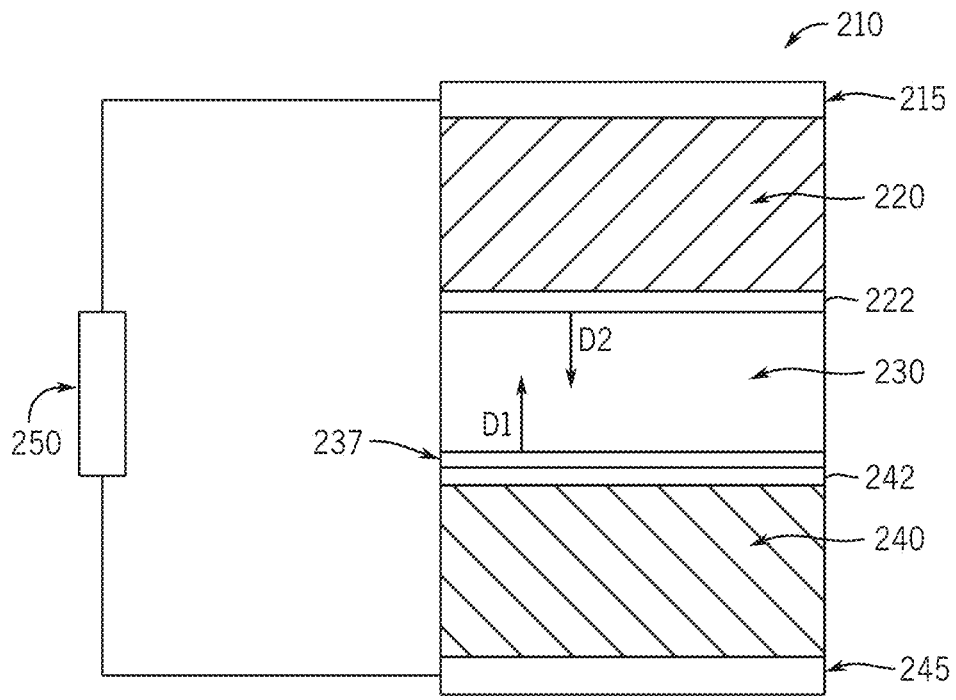
FIG. 2 is a schematic of another embodiment according to the invention of an electrochemical cell comprising a cathode, an anode, an electrolyte, and a structure comprising a piezoelectric material, wherein the structure is a piezoelectric layer coated on the surface of a separator with a specific porosity. The structure is between the cathode and the anode. Specifically, the coated piezoelectric layer is in contact with the surface of the anode.

FIG. 2 illustrates a designing strategy of coupling a structure comprising a piezoelectric material into a non-limiting example electrochemical cell 210. The electrochemical cell 210 includes a cathode 220, an anode 240, and a structure comprising a piezoelectric material in the form of a piezoelectric layer 237 coated on one surface of a separator 230 with a specific porosity. The cathode 220 has a solid-electrolyte interphase layer 222 formed thereon, and the anode 240 has a solid-electrolyte interphase layer 242 formed thereon. At least a portion of an amount of electrolyte is arranged between the cathode 220 and the anode 240. Specifically, the structure is between the cathode 220 and the anode 240, and the coated piezoelectric layer 237 is in contact with the surface of the solid-electrolyte interphase layer 242 of the anode 240, and the surface of the separator 230 is in contact with the surface of the solid-electrolyte interphase layer 222 of the cathode 220. The current collectors 215, 245 of the electrochemical cell 210 may be in electrical communication with an electrical component 250. During cycling, the ionic intercalation and deintercalation take place in the electrodes within the electrochemical cell 210, which changes the volume of the electrodes and creates a deformation of the piezoelectric layer 237 along the thickness directions D1, D2. This deformation will create a piezoelectric voltage across the thickness directions D1, D2 of the piezoelectric layer 237, which changes the potential within the electrochemical cell and the ionic transport and can improve the performance of the electrochemical cell. When the electrochemical cell 210 is with a metal anode 240, the combination of the ionic electrodeposition and the ionic intercalation/deintercalation in the counter porous electrode during cycling can cause a deformation of the piezoelectric layer 237 along the thickness directions D1, D2, which creates a voltage along the thickness directions D1, D2 of the piezoelectric layer 237, and due to the surface of the metallic electrodes can be rough, the protrusions' evolution can also create a stretching to the piezoelectric layer 237 along the transverse directions (normal to thickness directions D1, D2) and generates a voltage. These generated voltages can combine and have a more significant influence on the ion transport and affect the performances of the electrochemical cell more.

Figure 3:
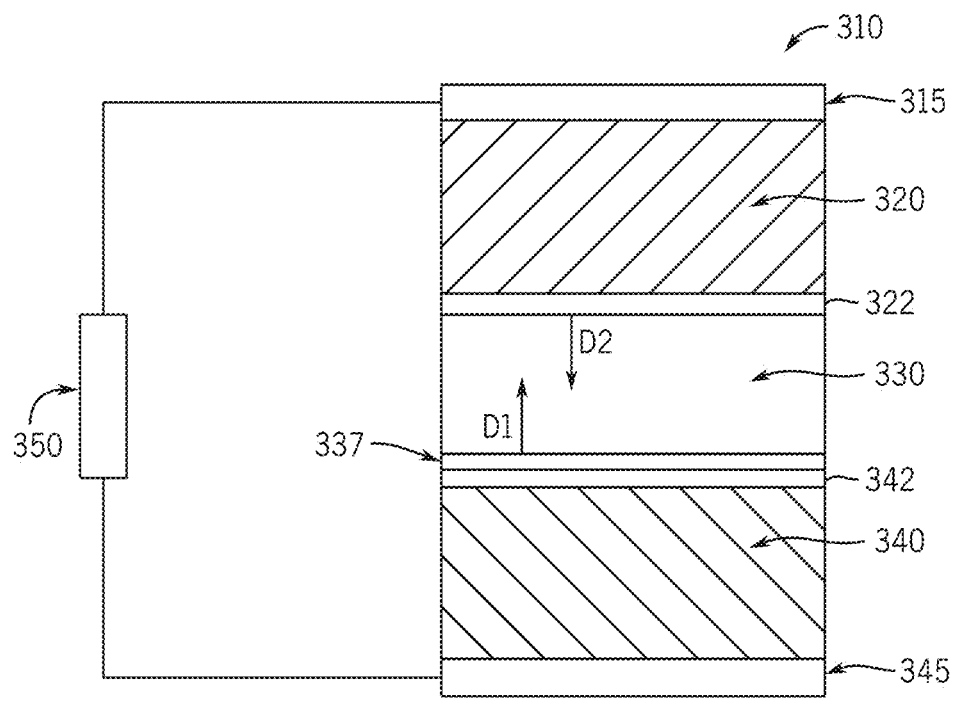
FIG. 3 is a schematic of yet another embodiment according to the invention of an electrochemical cell comprising a cathode, an anode, an electrolyte, and a structure comprising a piezoelectric material, wherein the structure is a piezoelectric layer coated on the surface of a bulk piezoelectric separator with a specific porosity. The structure is between the cathode and the anode. Specifically, the coated piezoelectric layer is in contact with the surface of the anode.

FIG. 3 illustrates a designing strategy of coupling a structure comprising a piezoelectric material into a non-limiting example electrochemical cell 310. The electrochemical cell 310 includes a cathode 320, an anode 340, and a structure comprising a piezoelectric material in the form of a piezoelectric layer 337 (with a specific porosity) coated on one surface of a bulk piezoelectric separator 330 with a specific porosity. The cathode 320 has a solid-electrolyte interphase layer 322 formed thereon, and the anode 340 has a solid-electrolyte interphase layer 342 formed thereon. At least a portion of an amount of electrolyte is arranged between the cathode 320 and the anode 340. Specifically, the structure is between the cathode 320 and the anode 340, and the piezoelectric layer 337 is in contact with the surface of the solid-electrolyte interphase layer 342 of the anode 340. The current collectors 315, 345 of the electrochemical cell 310 may be in electrical communication with an electrical component 350. During cycling, the ionic intercalation and deintercalation take place in the electrodes within the electrochemical cell 310, which changes the volume of the electrodes and creates deformations of the piezoelectric separator 330 and the piezoelectric layer 337 along the thickness directions D1, D2. These deformations will create piezoelectric voltages across the thickness directions D1, D2 of the piezoelectric separator 330 and piezoelectric layer 337. These voltages can combine and have a more significant influence on the potential within the electrochemical cell and the ionic transport and can improve the performance of the electrochemical cell 310 more. When the electrochemical cell 310 is with a metal anode 340, the combination of the ionic electrodeposition and the ionic intercalation/deintercalation in the counter porous electrode during cycling can cause deformations of the piezoelectric separator 330 and the piezoelectric layer 337 along the thickness directions D1, D2, which creates voltages along the thickness directions D1, D2 of the piezoelectric separator 330 and the piezoelectric layer 337, and due to the surface of the metallic electrodes can be rough, the protrusions' evolution can also create a stretching to the piezoelectric layer 337 along the transverse directions (normal to thickness directions D1, D2) and generates a voltage. These generated voltages can combine together and have a more significant influence on the ion transport and affect the performances of the electrochemical cell 310 more.

Figure 4:
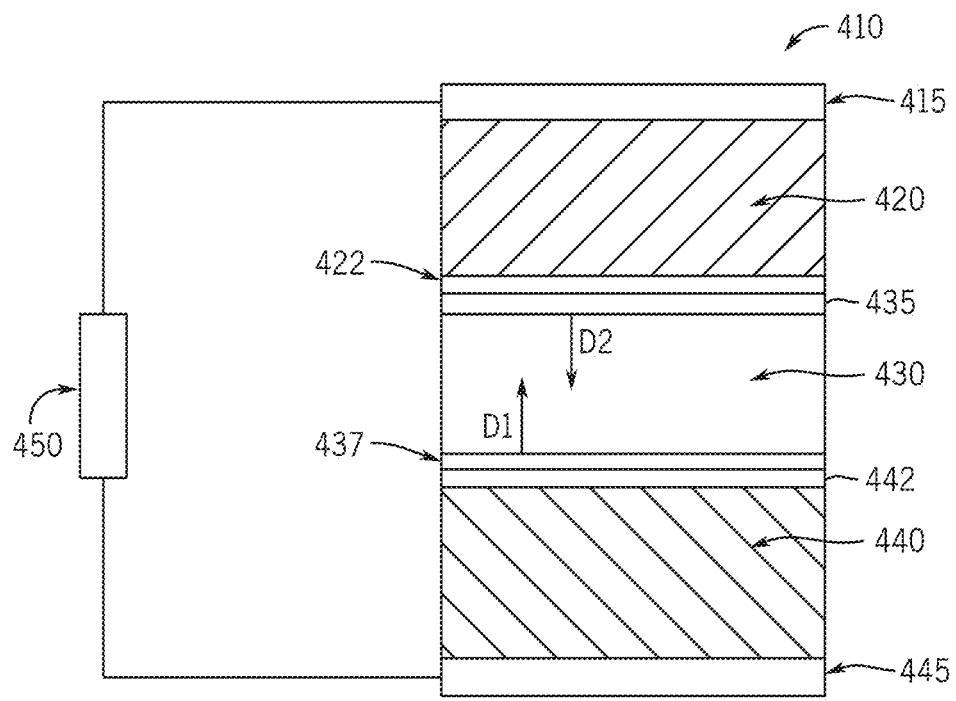
FIG. 4 is a schematic of still another embodiment according to the invention of an electrochemical cell comprising a cathode, an anode, an electrolyte, and a structure comprising a piezoelectric material. The structure is two piezoelectric layers coated on the two surfaces of a separator with a specific porosity. The structure is between the cathode and the anode. Specifically, the coated piezoelectric layers are in contact with the surface of the cathode and the surface of the anode, respectively.

FIG. 4 illustrates a designing strategy of coupling a structure comprising a piezoelectric material into a non-limiting example electrochemical cell 410. The electrochemical cell 410 includes a cathode 420, an anode 440, and a structure comprising a piezoelectric material in the form of two piezoelectric layers 435, 437 (with a specific porosity) coated on the two surfaces of a separator 430 with a specific porosity. The cathode 420 has a solid-electrolyte interphase layer 422 formed thereon, and the anode 440 has a solid-electrolyte interphase layer 442 formed thereon. At least a portion of an amount of electrolyte is arranged between the cathode 420 and the anode 440. Specifically, the structure is between the cathode 420 and the anode 440, and the piezoelectric layers 435, 437 are in contact with the surface of the solid-electrolyte interphase layer 422 of the cathode 420 and the surface of the solid-electrolyte interphase layer 442 of the anode 440. The current collectors 415, 445 of the electrochemical cell 410 may be in electrical communication with an electrical component 450. During cycling, the ionic intercalation and deintercalation take place in the electrodes within the electrochemical cell 410, which changes the volume of the electrodes and will create deformations of the piezoelectric layers 435, 437 along the thickness directions D1, D2. These deformations will create piezoelectric voltages across the thickness directions D1, D2 of the piezoelectric layers 435, 437. These voltages can combine and have a more significant influence on the potential within the electrochemical cell and the ionic transport and can improve the performance of the electrochemical cell 410 more. When the electrochemical cell 410 is with a metal anode 440, the combination of the ionic electrodeposition and the ionic intercalation/deintercalation in the porous electrode during cycling can cause deformations of the piezoelectric layers 435, 437 along the thickness directions D1, D2, which creates voltages along the thickness directions D1, D2 of the piezoelectric layers 435, 437, and due to the surface of the metallic electrodes can be rough, the protrusions' evolution can create a stretching to the piezoelectric layers 435, 437 along the transverse directions (normal to thickness directions D1, D2) and generates a voltage. These generated voltages can combine and have a more significant influence on the ion transport and affect the performances of the electrochemical cell more.

Figure 5:
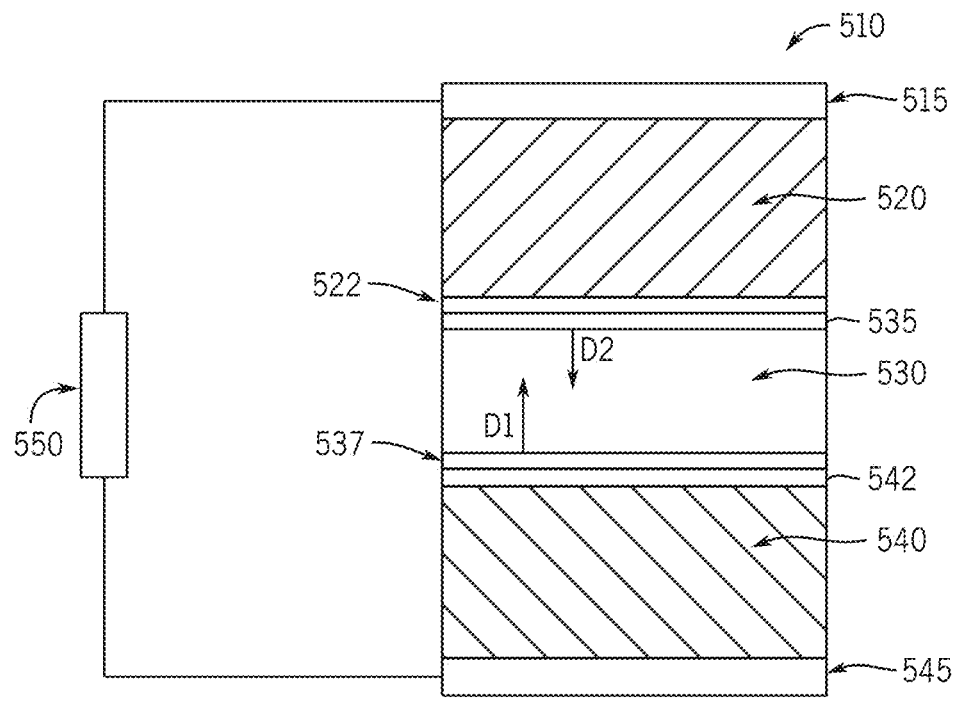
FIG. 5 is a schematic of yet another embodiment according to the invention of an electrochemical cell comprising a cathode, an anode, an electrolyte, and a structure comprising a piezoelectric material. The structure is two piezoelectric layers coated on the two surfaces of a bulk piezoelectric separator with a specific porosity. The structure is between the cathode and the anode. Specifically, the coated piezoelectric layers are in contact with the surface of the cathode and the surface of the anode, respectively.

FIG. 5 illustrates a designing strategy of coupling a structure comprising a piezoelectric material into a non-limiting example electrochemical cell 510. The electrochemical cell 510 includes a cathode 520, an anode 540, and a structure comprising a piezoelectric material in the form of two piezoelectric layers 535, 537 (with a specific porosity) coated on the two surfaces of a bulk piezoelectric separator 530 with a specific porosity. The cathode 520 has a solid-electrolyte interphase layer 522 formed thereon, and the anode 540 has a solid-electrolyte interphase layer 542 formed thereon. At least a portion of an amount of electrolyte is arranged between the cathode 520 and the anode 540. Specifically, the structure is between the cathode 520 and the anode 540, and the piezoelectric layers 535, 537 are in contact with the surface of the solid-electrolyte interphase layer 522 of the cathode 520 and the surface of the solid-electrolyte interphase layer 542 of the anode 540. The current collectors 515, 545 of the electrochemical cell 510 may be in electrical communication with an electrical component 550. During cycling, the ionic intercalation and deintercalation take place in the electrodes within the electrochemical cell 510, which changes the volume of the electrodes and will create deformations of the piezoelectric separator 530 and the piezoelectric layers 535, 537 along the thickness directions D1, D2. These deformations will create piezoelectric voltages across the thickness directions D1, D2 of the piezoelectric separator 530 and the piezoelectric layers. These voltages can combine and have a more significant influence on the potential within the electrochemical cell and the ionic transport and can improve the performance of the electrochemical cell more. When the electrochemical cell 510 is with a metal anode 540, the combination of the ionic electrodeposition and the ionic intercalation/deintercalation in the porous electrode during cycling can cause deformations of the piezoelectric separator 530 and the piezoelectric layers 535, 537 along the thickness directions D1, D2, which creates voltages along the thickness directions D1, D2 of the piezoelectric separator 530 and the piezoelectric layers 535, 537, and due to the surface of the metallic electrodes can be rough, the protrusions' evolution can create a stretching to the piezoelectric layers 535, 537 along the transverse directions (normal to thickness directions D1, D2) and generates a voltage. These generated voltages can combine and have a more significant influence on the ion transport and affect the performances of the electrochemical cell 510 more.

Figure 6:
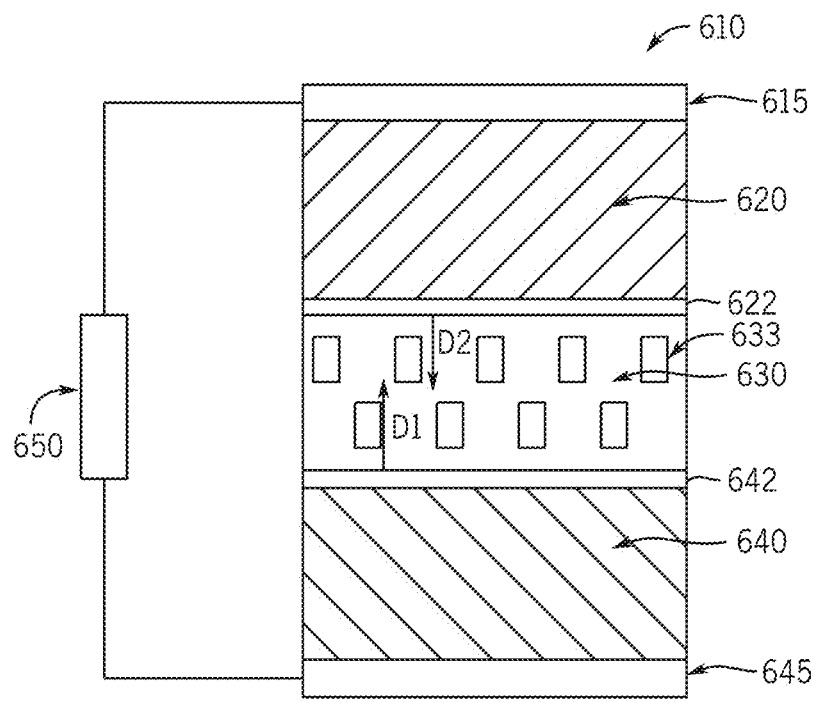
FIG. 6 is a schematic of still another embodiment according to the invention of an electrochemical cell comprising a cathode, an anode, an electrolyte, and a structure comprising a piezoelectric material. The structure is multiple piezoelectric units coupled into a separator with a specific porosity. The structure is between the cathode and the anode.

FIG. 6 illustrates a designing strategy of coupling a structure comprising a piezoelectric material into a non-limiting example electrochemical cell 610. The electrochemical cell 610 includes a cathode 620, an anode 640, and a structure comprising a piezoelectric material in the form of a separator 630 (with a specific porosity) including piezoelectric units 633 (which can be particles, particle clusters, etc. uniformly distributed inside a matrix of the separator 630). The cathode 620 has a solid-electrolyte interphase layer 622 formed thereon, and the anode 640 has a solid-electrolyte interphase layer 642 formed thereon. At least a portion of an amount of electrolyte is arranged between the cathode 620 and the anode 640. Specifically, the structure is between the cathode 620 and the anode 640. The current collectors 615, 645 of the electrochemical cell 610 may be in electrical communication with an electrical component 650. During cycling, the ionic intercalation and deintercalation take place in the electrodes within the electrochemical cell 610, which changes the volume of the electrodes and will create deformations of the piezoelectric units 633. These deformations will create piezoelectric voltages within the piezoelectric units 633. These voltages combine to change the potential within the electrochemical cell 610 and the ionic transport and can improve the performance of the electrochemical cell 610. When the electrochemical cell 610 is with a metal anode 640, the combination of the ionic electrodeposition and the ionic intercalation/deintercalation in the porous electrode during cycling can cause deformations of the piezoelectric units 633, which creates voltages within the piezoelectric units 633. These generated voltages combining together can affect the ion transport and affect the performances of the electrochemical cell 610.

Figure 7:
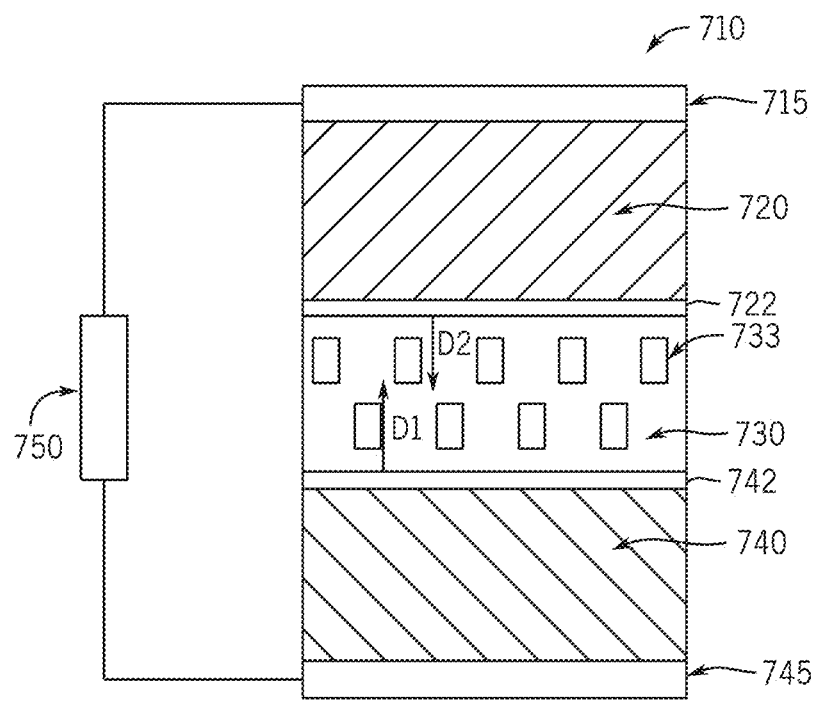
FIG. 7 is a schematic of yet another embodiment according to the invention of an electrochemical cell comprising a cathode, an anode, an electrolyte, and a structure comprising a piezoelectric material. The structure is multiple piezoelectric units coupled into a bulk piezoelectric separator with a specific porosity. The structure is between the cathode and the anode.

FIG. 7 illustrates a designing strategy of coupling a structure comprising a piezoelectric material into a non-limiting example electrochemical cell 710. The electrochemical cell 710 includes a cathode 720, an anode 740, and a structure comprising a piezoelectric material in the form of a bulk piezoelectric separator 730 (with a specific porosity) including piezoelectric units 733 (which can be particles, particle clusters, etc. uniformly distributed inside a matrix of the separator 730). The cathode 720 has a solid-electrolyte interphase layer 722 formed thereon, and the anode 740 has a solid-electrolyte interphase layer 742 formed thereon. At least a portion of an amount of electrolyte is arranged between the cathode 720 and the anode 740. Specifically, the structure is between the cathode 720 and the anode 740. The current collectors 715, 745 of the electrochemical cell 710 may be in electrical communication with an electrical component 750. During cycling, the ionic intercalation and deintercalation take place in the electrodes within the electrochemical cell 710, which changes the volume of the electrodes and will create deformations of the piezoelectric units 733 and deformation of the piezoelectric separator 730 along the thickness directions D1, D2. These deformations will create piezoelectric voltages within the piezoelectric units 733 and a voltage within the piezoelectric separator 730 along the thickness directions D1, D2. These voltages combine to have a more significant influence on the potential within the electrochemical cell 710 and the ionic transport and can improve the performance of the electrochemical cell 710 more. When the electrochemical cell 710 is with a metal anode 740, the combination of the ionic electrodeposition and the ionic intercalation/deintercalation in the porous electrode during cycling can cause deformations of the piezoelectric units 733 and a deformation within the piezoelectric separator 730 along the thickness directions D1, D2, which creates voltages within the piezoelectric units 733 and a voltage within the piezoelectric separator 730 along the thickness directions D1, D2. These generated voltages combining together can have a more significant influence on the ion transport and affect the performances of the electrochemical cell 710 more.

Figure 8:
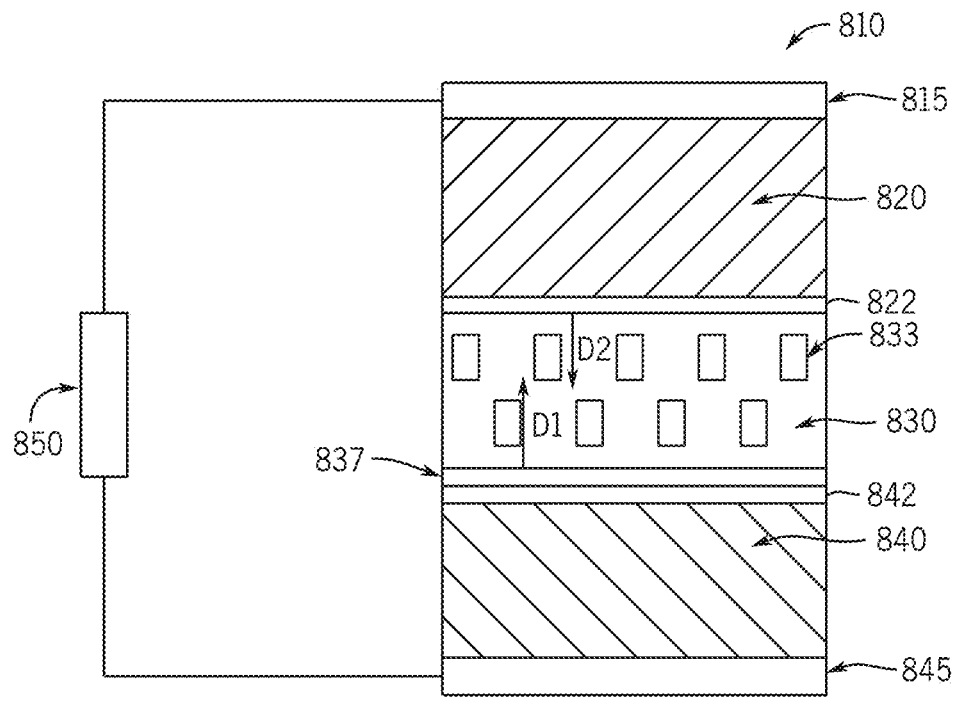
FIG. 8 is a schematic of still another embodiment according to the invention of an electrochemical cell comprising a cathode, an anode, an electrolyte, and a structure comprising a piezoelectric material. The structure is multiple piezoelectric units coupled into a separator with a specific porosity, and a piezoelectric layer is also coated on one surface of the separator. The structure is between the cathode and the anode. Specifically, the coated piezoelectric layer is in contact with the surface of the anode.

FIG. 8 illustrates a designing strategy of coupling a structure comprising a piezoelectric material into a non-limiting example electrochemical cell 810. The electrochemical cell 810 includes a cathode 820, an anode 840, and a structure comprising a piezoelectric material in the form of a piezoelectric layer 837 coated on one surface of a separator 830 (with a specific porosity) including piezoelectric units 833 (which can be particles, particle clusters, etc. uniformly distributed inside a matrix of the separator 830). The cathode 820 has a solid-electrolyte interphase layer 822 formed thereon, and the anode 840 has a solid-electrolyte interphase layer 842 formed thereon. At least a portion of an amount of electrolyte is arranged between the cathode 820 and the anode 840. Specifically, the structure is between the cathode 820 and the anode 840, and the piezoelectric layer 837 is in contact with the surface of the solid-electrolyte interphase layer 842 of the anode 840. The current collectors 815, 845 of the electrochemical cell 810 may be in electrical communication with an electrical component 850. During cycling, the ionic intercalation and deintercalation take place in the electrodes within the electrochemical cell 810, which changes the volume of the electrodes and will create deformations of the piezoelectric units 833 and deformation of the piezoelectric layer 837 along the thickness directions D1, D2. These deformations will create piezoelectric voltages within the piezoelectric units 833 and a voltage within the piezoelectric layer 837 along the thickness directions D1, D2. These voltages combine to have a more significant influence on the potential within the electrochemical cell 810 and the ionic transport and can improve the performance of the electrochemical cell 810 more. When the electrochemical cell 810 is with a metal anode 840, the combination of the ionic electrodeposition and the ionic intercalation/deintercalation in the porous electrode during cycling can cause deformations of the piezoelectric units 833 and a deformation within the piezoelectric layer 837 along the thickness directions D1, D2, which creates voltages within the piezoelectric units 833 and a voltage within the piezoelectric layer 837 along the thickness directions D1, D2, and due to the surface of the metallic electrodes can be rough, the protrusions' evolution can create a stretching to the piezoelectric layer 837 along the transverse directions (normal to thickness directions D1, D2) and generates a voltage. These generated voltages combining together can have a more significant influence on the ion transport and affect the performances of the electrochemical cell 810 more.

Figure 9:
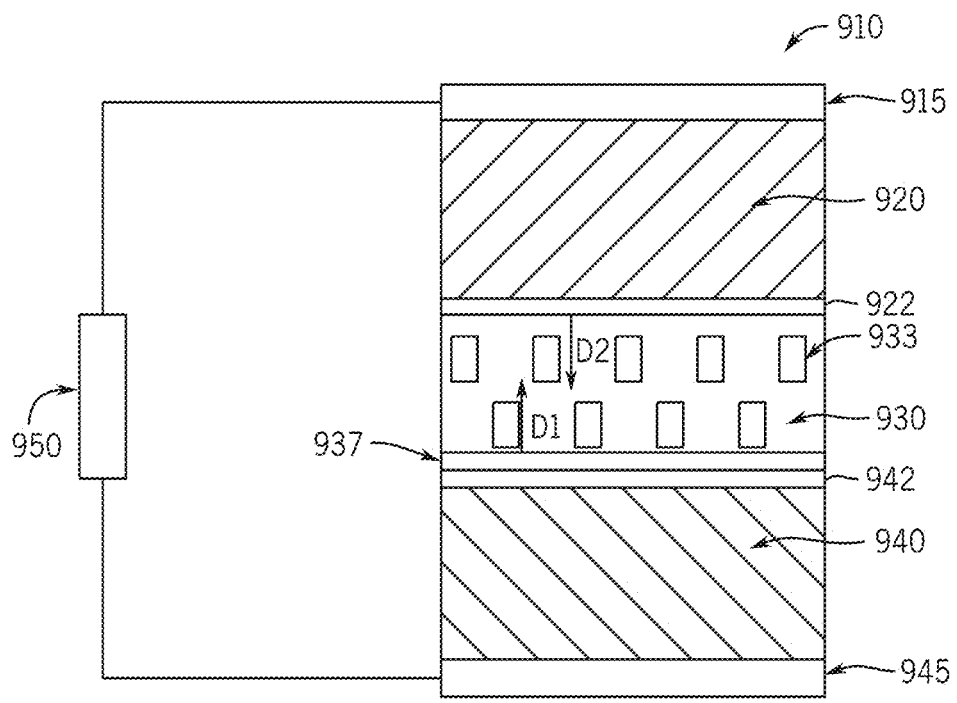
FIG. 9 is a schematic of yet another embodiment according to the invention of an electrochemical cell comprising a cathode, an anode, an electrolyte, and a structure comprising a piezoelectric material. The structure is multiple piezoelectric units coupled into a bulk piezoelectric separator with a specific porosity, and a piezoelectric layer is also coated on one surface of the bulk piezoelectric separator. The structure is between the cathode and the anode. Specifically, the coated piezoelectric layer is in contact with the surface of the anode.

FIG. 9 illustrates a designing strategy of coupling a structure comprising a piezoelectric material into a non-limiting example electrochemical cell 910. The electrochemical cell 910 includes a cathode 920, an anode 940, and a structure comprising a piezoelectric material in the form of a bulk piezoelectric layer 937 coated on one surface of a piezoelectric separator 930 (with a specific porosity) including piezoelectric units 933 (which can be particles, particle clusters, etc. uniformly distributed inside a matrix of the separator 930). The cathode 920 has a solid-electrolyte interphase layer 922 formed thereon, and the anode 940 has a solid-electrolyte interphase layer 942 formed thereon. At least a portion of an amount of electrolyte is arranged between the cathode 920 and the anode 940. Specifically, the structure is between the cathode 920 and the anode 940, and the piezoelectric layer 937 is in contact with the surface of the solid-electrolyte interphase layer 942 of the anode 940. The current collectors 915, 945 of the electrochemical cell 910 may be in electrical communication with an electrical component 950. During cycling, the ionic intercalation and deintercalation take place in the electrodes within the electrochemical cell, which changes the volume of the electrodes and will create deformations of the piezoelectric units 933 and deformations of the piezoelectric layer 937 and the piezoelectric separator 930 along the thickness directions D1, D2. These deformations will create piezoelectric voltages within the piezoelectric units 933 and a voltage within the piezoelectric layer 937 and the piezoelectric separator 930 along the thickness directions D1, D2. These voltages combine to have a more significant influence on the potential within the electrochemical cell 910 and the ionic transport and can improve the performance of the electrochemical cell 910 more. When the electrochemical cell 910 is with a metal anode 940, the combination of the ionic electrodeposition and the ionic intercalation/deintercalation in the porous electrode during cycling can cause deformations of the piezoelectric units 933 and deformations within the piezoelectric layer 937 and the piezoelectric separator 930 along the thickness directions D1, D2, which creates voltages within the piezoelectric units 933 and a voltage within the piezoelectric layer 937 and the piezoelectric separator 930 along the thickness directions D1, D2, and due to the surface of the metallic electrodes can be rough, the protrusions' evolution can create a stretching to the piezoelectric layer 937 along the transverse directions (normal to thickness directions D1, D2) and generates a voltage. These generated voltages combining together can have a more significant influence on the ion transport and affect the performances of the electrochemical cell 910 more.

Figure 10:
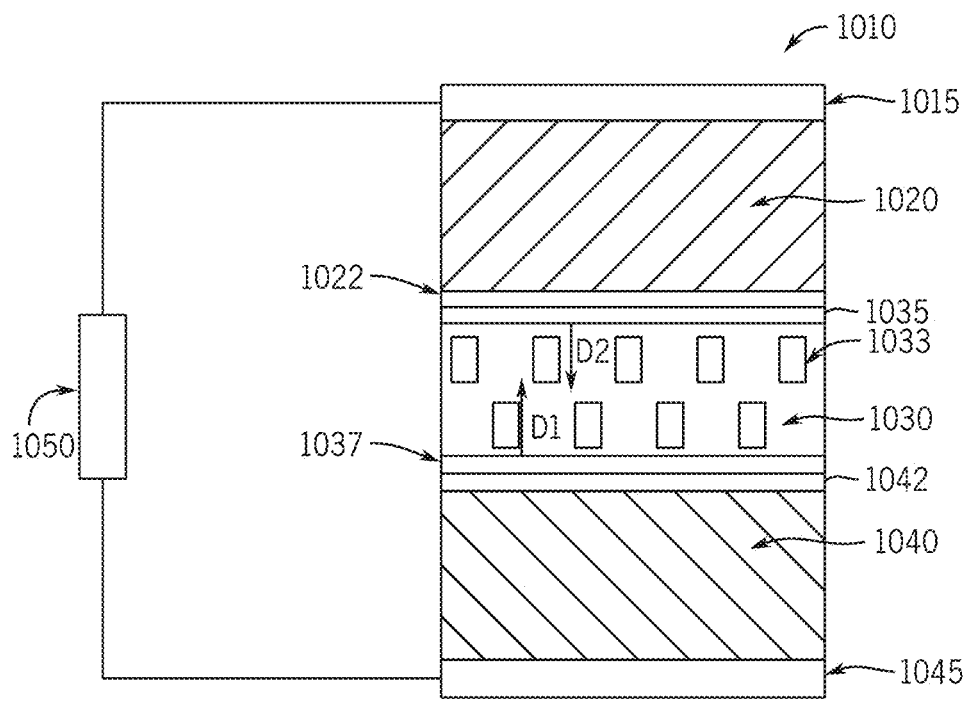
FIG. 10 is a schematic of still another embodiment according to the invention of an electrochemical cell comprising a cathode, an anode, an electrolyte, and a structure comprising a piezoelectric material. The structure is multiple piezoelectric units coupled into a separator with a specific porosity, and two piezoelectric layers are also coated on the two surface of the separator. The structure is between the cathode and the anode. Specifically, the coated piezoelectric layers are in contact with the surface of the cathode and the surface of the anode, respectively.

FIG. 10 illustrates a designing strategy of coupling a structure comprising a piezoelectric material into a non-limiting example electrochemical cell 1010. The electrochemical cell 1010 includes a cathode 1020, an anode 1040, and a structure comprising a piezoelectric material in the form of two piezoelectric layers 1035, 1037 coated on the two surfaces of a separator 1030 (with a specific porosity) including piezoelectric units 1033 (which is uniformly distributed inside a matrix of the separator 1030). The cathode 1020 has a solid-electrolyte interphase layer 1022 formed thereon, and the anode 1040 has a solid-electrolyte interphase layer 1042 formed thereon. At least a portion of an amount of electrolyte is arranged between the cathode 1020 and the anode 1040. Specifically, the structure is between the cathode 1020 and the anode 1040, and the piezoelectric layers 1035, 1037 are in contact with the surface of the solid-electrolyte interphase layer 1022 of the cathode 1020 and the surface of the solid-electrolyte interphase layer 1042 of the anode 1040. The current collectors 1015, 1045 of the electrochemical cell 1010 may be in electrical communication with an electrical component 1050. During cycling, the ionic intercalation and deintercalation take place in the electrodes within the electrochemical cell 1010, which changes the volume of the electrodes and will create deformations of the piezoelectric units 1033 and deformations of the piezoelectric layers 1035, 1037 along the thickness directions D1, D2. These deformations will create piezoelectric voltages within the piezoelectric units 1033 and voltages within the piezoelectric layers 1035, 1037 along the thickness directions D1, D2. These voltages combine to have a more significant influence on the potential within the electrochemical cell 1010 and the ionic transport and can improve the performance of the electrochemical cell 1010 more. When the electrochemical cell 1010 is with a metal anode 1040, the combination of the ionic electrodeposition and the ionic intercalation/deintercalation in the porous electrode during cycling can cause deformations of the piezoelectric units 1033 and deformations within the piezoelectric layers 1035, 1037 along the thickness directions D1, D2, which creates voltages within the piezoelectric units 1033 and voltages within the piezoelectric layers 1035, 1037 along the thickness directions D1, D2, and due to the surface of the metallic electrodes can be rough, the protrusions' evolution can create a stretching to the piezoelectric layers 1035, 1037 along the transverse directions (normal to thickness directions D1, D2) and generates a voltage. These generated voltages combining together can have a more significant influence on the ion transport and affect the performances of the electrochemical cell 1010 more.

Figure 11:
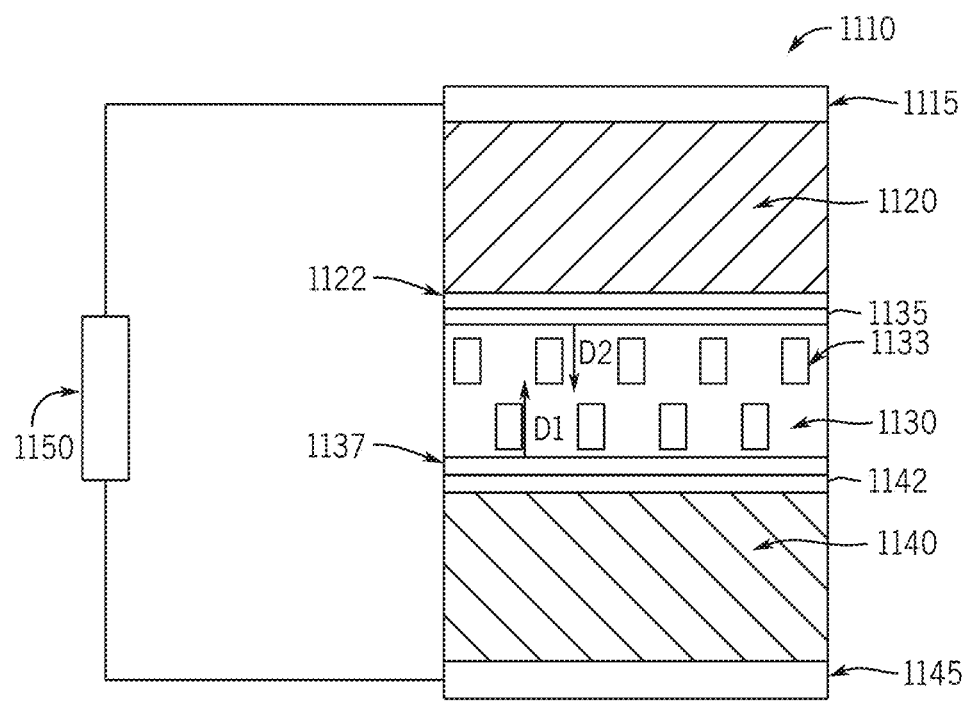
FIG. 11 is a schematic of yet another embodiment according to the invention of an electrochemical cell comprising a cathode, an anode, an electrolyte, and a structure comprising a piezoelectric material. The structure is multiple piezoelectric units coupled into a bulk piezoelectric separator with a specific porosity, and two piezoelectric layers are also coated on the two surface of the bulk piezoelectric separator. The structure is between the cathode and the anode. Specifically, the coated piezoelectric layers are in contact with the surface of the cathode and the surface of the anode, respectively.

FIG. 11 illustrates a designing strategy of coupling a structure comprising a piezoelectric material into a non-limiting example electrochemical cell 1110. The electrochemical cell 1110 includes a cathode 1120, an anode 1140, and a structure comprising a piezoelectric material in the form of two piezoelectric layers 1135, 1137 coated on the two surfaces of a bulk piezoelectric separator 1130 (with a specific porosity) including piezoelectric units 1133 (which can be particles, particle clusters, etc. uniformly distributed inside a matrix of the separator 1130). The cathode 1120 has a solid-electrolyte interphase layer 1122 formed thereon, and the anode 1140 has a solid-electrolyte interphase layer 1142 formed thereon. At least a portion of an amount of electrolyte is arranged between the cathode 1120 and the anode 1140. Specifically, the structure is between the cathode 1120 and the anode 1140, and the piezoelectric layers 1135, 1137 are in contact with the surface of the solid-electrolyte interphase layer 1122 of the cathode 1120 and the surface of the solid-electrolyte interphase layer 1142 of the anode 1140. The current collectors 1115, 1145 of the electrochemical cell 1110 may be in electrical communication with an electrical component 1150. During cycling, the ionic intercalation and deintercalation take place in the electrodes within the electrochemical cell, which changes the volume of the electrodes and will create deformations of the piezoelectric units 1133 and deformations of the piezoelectric layers 1135, 1137 and the piezoelectric separator 1130 along the thickness directions D1, D2. These deformations will create piezoelectric voltages within the piezoelectric units 1133 and voltages within the piezoelectric layers 1135, 1137 and the piezoelectric separator 1130 along the thickness directions D1, D2. These voltages combine to have a more significant influence on the potential within the electrochemical cell 1110 and the ionic transport and can improve the performance of the electrochemical cell 1110 more. When the electrochemical cell 1110 is with a metal anode 1140, the combination of the ionic electrodeposition and the ionic intercalation/deintercalation in the porous electrode during cycling can cause deformations of the piezoelectric units 1133 and deformations within the piezoelectric layers 1135, 1137 and the piezoelectric separator 1130 along the thickness directions D1, D2, which creates voltages within the piezoelectric units 1133 and voltages within the piezoelectric layers 1135, 1137 and the piezoelectric separator 1130 along the thickness directions D1, D2, and due to the surface of the metallic electrodes can be rough, the protrusions' evolution can create a stretching to the piezoelectric layers 1135, 1137 along the transverse directions (normal to thickness directions D1, D2) and generates a voltage. These generated voltages combining together can have a more significant influence on the ion transport and affect the performances of the electrochemical cell more.

EXAMPLES

The following Examples are provided in order to demonstrate and further illustrate certain embodiments and aspects of the present invention and are not to be construed as limiting the scope of the invention.

Example 1

Figure 12:
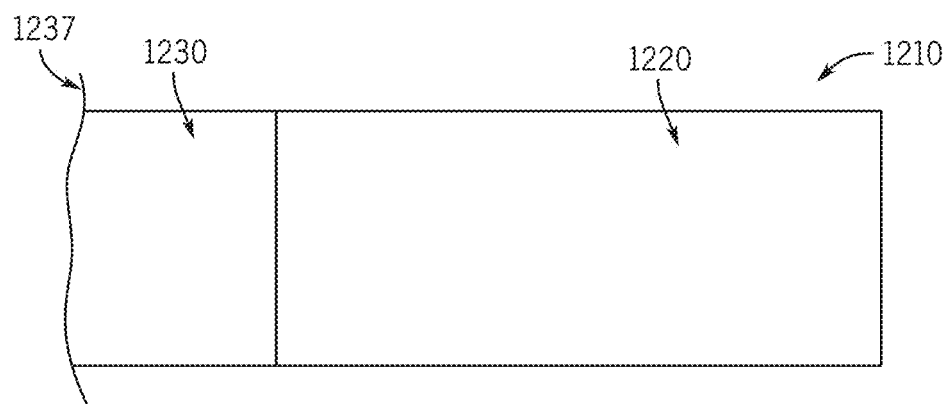
FIG. 12 is a numerical model for Example 1 below, which comprises a lithium titanium oxide (LTO) cathode, a lithium metal anode, and a piezoelectric layer coated on the surface of a separator.
Figure 13:
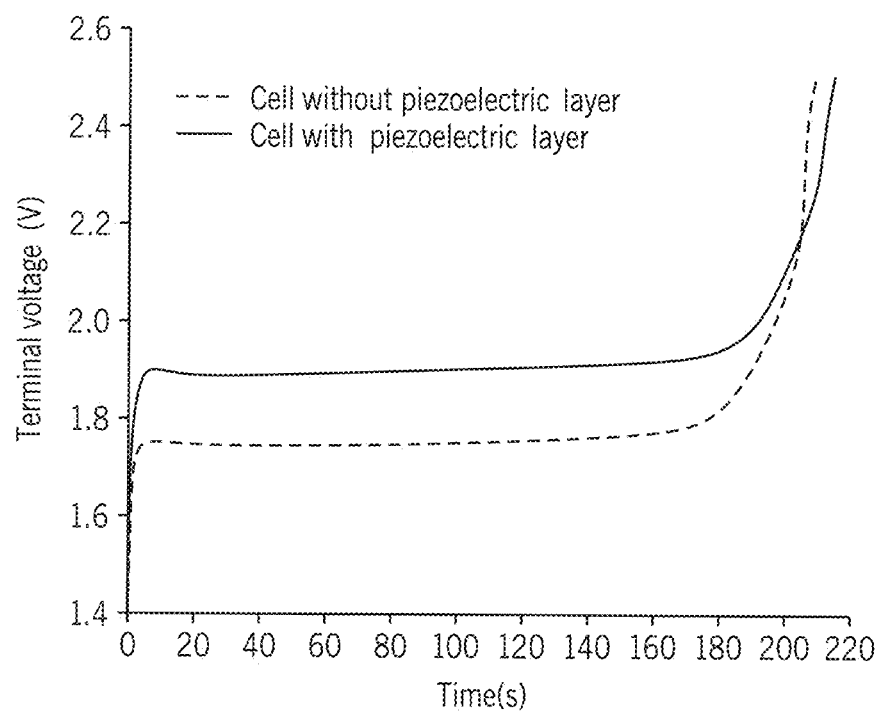
FIG. 13 is a numerical result (the terminal voltage curve of the cell with and without the piezoelectric layer) for Example 1 below.

In this example, numerical simulations are used to evaluate the performance of a structure comprising a piezoelectric material in an electrochemical cell. The model is a half-cell 1210, including a porous lithium titanium oxide (LTO) cathode 1220, a separator 1230 with a piezoelectric layer coated 1237 (see FIG. 12), and a lithium metal anode. The electrolyte is 1 M $LiPF_6$ in a solvent of ethylene carbonate (EC) and dimethyl carbonate (DMC) mixture (1:1 v %). The charge and discharge current densities are both set as 5 $mA/cm^2$. During charging and discharging, the piezoelectric layer undergoes a deformation along the thickness direction due to the volume change associated with the electrodeposition process on the anode surface and the lithium intercalation into/deintercalation from LTO. This deformation generates a voltage which affects the reaction overpotential and ion transport. FIG. 13 shows the voltage profile during charging with and without the piezoelectric coating layer 1237. We can observe a longer charging time with the piezoelectric layer 1237. Also, the terminal voltage (the plateau region) of the cell with a piezoelectric layer is much higher. As a result, the electrochemical cell 1210 with the piezoelectric layer 1237 gives a higher capacity and energy than the electrochemical cell without a piezoelectric layer.

Example 2

Figure 14:
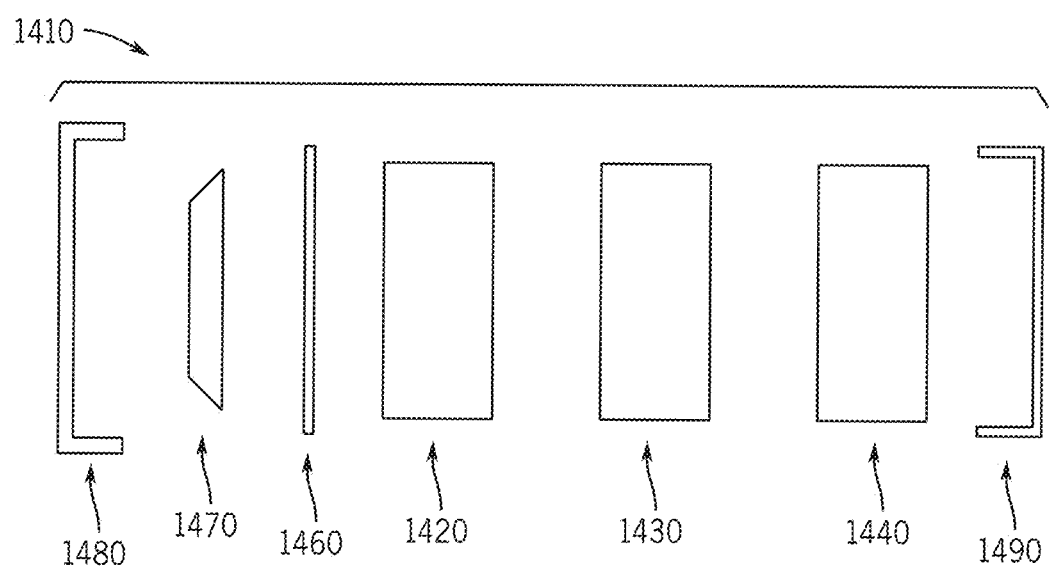
FIG. 14 is the experimental coin cell set-up for Example 2 below, which comprises an LTO cathode, a lithium metal anode, and a bulk piezoelectric layer.
Figure 15:
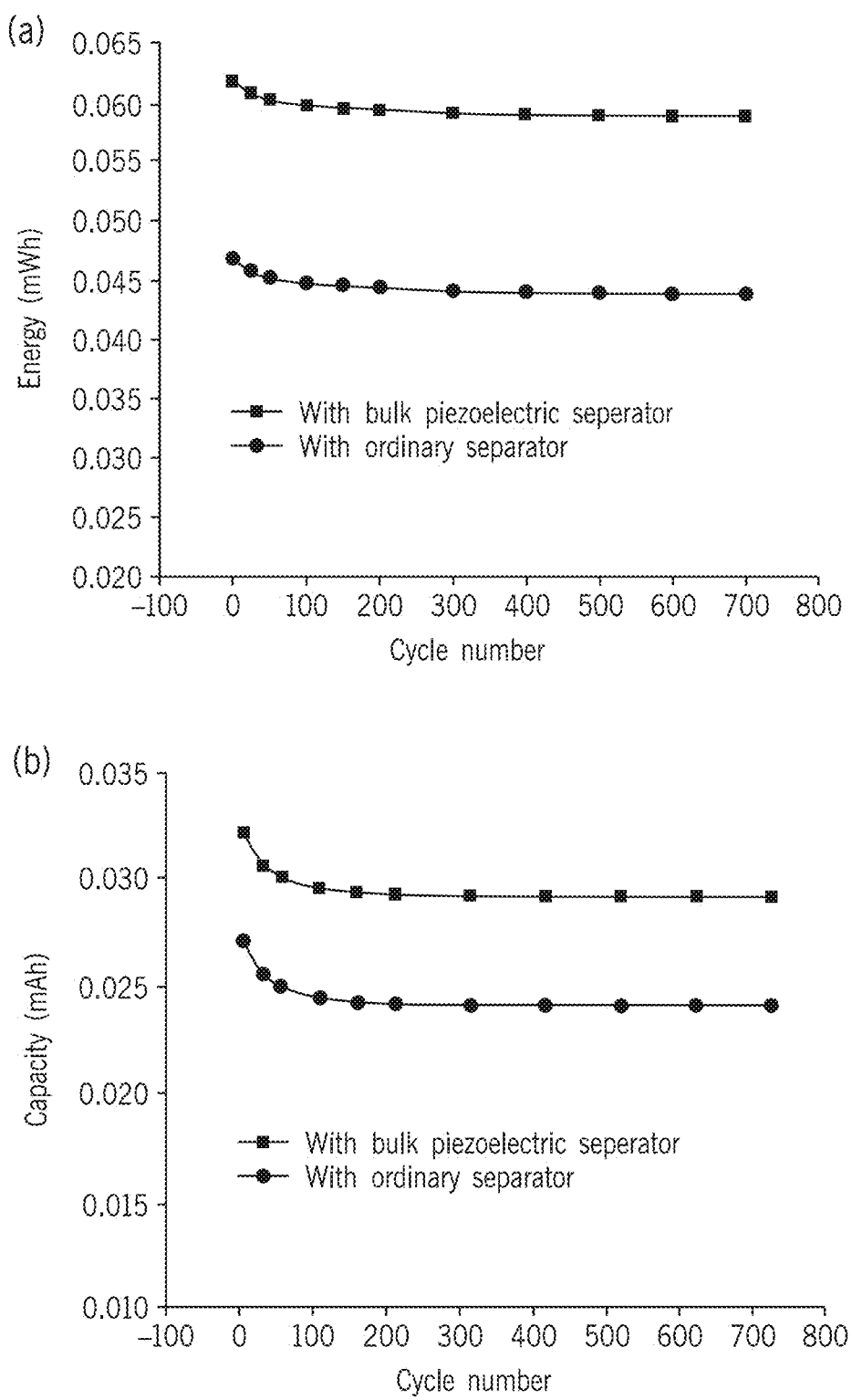
FIG. 15 shows experimental results for Example 2 below. Panel (a) of FIG. 15 shows cell energy using the bulk piezoelectric separator vs. the ordinary separator. The energy value given for each cycle is the average charge energy and discharge energy during that cycle. Panel (b) of FIG. 15 shows cell capacity using the bulk piezoelectric separator vs. the ordinary separator. The capacity value given for each cycle is the average charge capacity and discharge capacity during that cycle.

In this Example, experimental measurements are used to evaluate the performance of a structure comprising a piezoelectric material in an electrochemical cell. Coin cells 1410, as shown in FIG. 14, were assembled. The coin cell 1410 included a porous LTO cathode 1420, a bulk piezoelectric separator 1430, a lithium metal anode 1440, a spacer 1460, a spring 1470, an upper case 1480, and a lower case 1490. The electrolyte was 1 M $LiPF_6$ in a solvent of EC and DMC mixture (1:1 v %). The bulk piezoelectric separator was made of polyvinylidene difluoride (PVDF) and underwent a poling process to make it piezoelectric. The separator had a solid volume fraction of 0.5. The charge current density was set as 10 $mA/cm^2$ while the discharge current density was set as 2 $mA/cm^2$. During charging and discharging, the piezoelectric layer underwent a deformation along the thickness direction due to the volume change associated with the electrodeposition process on the anode surface and the lithium intercalation into/deintercalation from LTO. For comparison, we also assembled coin cells with a non-piezoelectric PVDF separator (without going through the poling process so that the material is non-piezoelectric. This is regarded as an ordinary separator). FIG. 15 shows the cell energy and cell capacity using the bulk piezoelectric separator vs. the ordinary separator. The energy value given for each cycle is the average charge energy and discharge energy during that cycle. The capacity value given for each cycle is the average charge capacity and discharge capacity during that cycle. The energy of the cell with a bulk piezoelectric PVDF separator is about 25% larger than that of the cell with a non-piezoelectric separator. Similarly, the piezoelectric separator increases the capacity by about 17%.

Thus, the present invention provides a system and method that can improve the capacity, energy and cycle life of an electrochemical cell by using a structure (e.g., a layer or a film) comprising a piezoelectric material.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment", "in embodiments", or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be used in alternative embodiments to those described, which have been presented for purposes of illustration and not of limitation. For instance, the piezoelectric film can be coated on a metal anode surface instead of on the separator surface. Therefore, the scope of the appended claims should not be limited to the description of the embodiments contained herein.

What is claimed is:

1. An electrochemical cell comprising:
an anode having a solid-electrolyte interphase layer formed thereon;
a cathode;
an electrolyte, wherein at least a portion of the electrolyte is located between the anode and cathode; and
a structure comprising a piezoelectric material, the structure contacting at least a portion of the solid-electrolyte interphase layer of the anode,
wherein a macroscopic dipole of the structure produces a voltage when the structure is subjected to a force from the anode or the solid-electrolyte interphase layer formed on the anode, and
wherein the macroscopic dipole of the structure is oriented relative to the force such that the voltage reduces an overpotential that causes solid-electrolyte interphase layer growth.

2. The electrochemical cell of claim 1 wherein:
the structure comprises a separator that prevents electronic conduction between the anode and the cathode and that permits ionic conduction via the electrolyte.

3. The electrochemical cell of claim 1 wherein:
the electrochemical cell comprises a separator that prevents electronic conduction between the anode and the cathode and that permits ionic conduction via the electrolyte, and
the structure comprises a layer of the piezoelectric material, the layer being coated on a surface of the separator.

4. The electrochemical cell of claim 1 wherein:
the electrochemical cell comprises a separator that prevents electronic conduction between the anode and the cathode and that permits ionic conduction via the electrolyte, the separator comprising a second piezoelectric material, and
the structure comprises a layer of the piezoelectric material, the layer being coated on a surface of the separator.

5. The electrochemical cell of claim 1 wherein:
the electrochemical cell comprises a separator that prevents electronic conduction between the anode and the cathode and that permits ionic conduction via the electrolyte,
the structure comprises a layer of the piezoelectric material, the layer being coated on a first surface of the separator, the layer contacting the solid-electrolyte interphase layer formed on the anode, and
the electrochemical cell further comprises a second structure comprising a second layer comprising a second piezoelectric material, the second layer being coated on a second surface of the separator, the second layer contacting a second solid-electrolyte interphase layer formed on the cathode.

6. The electrochemical cell of claim 1 wherein:
the electrochemical cell comprises a separator that prevents electronic conduction between the anode and the cathode and that permits ionic conduction via the electrolyte, the separator comprising a third piezoelectric material, and
the structure comprises a layer of the piezoelectric material, the layer being coated on a first surface of the separator, the layer contacting the solid-electrolyte interphase layer formed on the anode, and
the electrochemical cell further comprises a second structure comprising a second layer comprising a second piezoelectric material, the second layer being coated on a second surface of the separator, the second layer contacting a second solid-electrolyte interphase layer formed on the cathode.

7. The electrochemical cell of claim 1 wherein:
the piezoelectric material is selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyvinylidene fluoride, polyamides, liquid-crystalline polymers, polyureas, polyacrylonitrile, polyvinylidene chloride, polyvinyl acetate, polyphenylethernitrile, nylons, poly(vinylidene cyanide-vinylacetate), poly(1-bicyclobutanecarbonitrile), poly(vinylidene fluoride-trifluoroethylene), poly(vinylidene fluoride-tetrafluoroethylene), copolymers of these materials, or composites of these materials.

8. An electrochemical cell comprising:
an anode having a solid-electrolyte interphase layer formed thereon;
a cathode;
an electrolyte, wherein at least a portion of the electrolyte is located between the anode and cathode; and
a structure comprising units distributed in a matrix, the units comprising a piezoelectric material, the structure contacting at least a portion of the solid-electrolyte interphase layer of the anode, wherein a macroscopic dipole of the structure produces a voltage when the structure is subjected to a force from the anode or the solid-electrolyte interphase layer formed on the anode, and wherein the macroscopic dipole of the structure is oriented relative to the force such that the voltage reduces an overpotential that causes solid-electrolyte interphase layer growth.

9. The electrochemical cell of claim 8 wherein:

the matrix comprises a separator material that prevents electronic conduction between the anode and the cathode and that permits ionic conduction via the electrolyte.

10. The electrochemical cell of claim 8 wherein:

the matrix comprises a second piezoelectric material, and the matrix prevents electronic conduction between the anode and the cathode and permits ionic conduction via the electrolyte.

11. The electrochemical cell of claim 8 wherein:

the matrix comprises a separator material that prevents electronic conduction between the anode and the cathode and that permits ionic conduction via the electrolyte, and the structure comprises a layer of a second piezoelectric material, the layer of the second piezoelectric material being coated on a first surface of the structure, the layer of the second piezoelectric material contacting the solid-electrolyte interphase layer formed on the anode.

12. The electrochemical cell of claim 8 wherein:

the matrix comprises a second piezoelectric material, the matrix prevents electronic conduction between the anode and the cathode and permits ionic conduction via the electrolyte, and the structure comprises a layer of a third piezoelectric material, the layer of the third piezoelectric material being coated on a first surface of the structure, the layer of the third piezoelectric material contacting the solid-electrolyte interphase layer formed on the anode.

13. The electrochemical cell of claim 8 wherein:

the matrix comprises a separator material that prevents electronic conduction between the anode and the cathode and that permits ionic conduction via the electrolyte, the structure comprises a first layer of a second piezoelectric material, the first layer of the second piezoelectric material being coated on a first surface of the structure, the first layer of the second piezoelectric material contacting the solid-electrolyte interphase layer formed on the anode, and the structure comprises a second layer of a third piezoelectric material, the second layer of the third piezoelectric material being coated on a second surface of the structure, the second layer of the third piezoelectric material contacting a solid-electrolyte interphase layer formed on the cathode.

14. The electrochemical cell of claim 8 wherein:

the matrix comprises a second piezoelectric material, the matrix prevents electronic conduction between the anode and the cathode and permits ionic conduction via the electrolyte, the structure comprises a first layer of a third piezoelectric material, the first layer of the third piezoelectric material being coated on a first surface of the structure, the first layer of the third piezoelectric material contacting the solid-electrolyte interphase layer formed on the anode, and the structure comprises a second layer of a fourth piezoelectric material, the second layer of the fourth piezoelectric material being coated on a second surface of the structure, the second layer of the fourth piezoelectric material contacting a solid-electrolyte interphase layer formed on the cathode.

15. A method for reducing solid-electrolyte interphase layer growth in an electrochemical cell having an anode, a cathode, and an electrolyte located between the anode and the cathode, the method comprising:

(a) contacting at least a portion of a solid-electrolyte interphase layer formed on one of the anode or the cathode with a structure comprising a piezoelectric material, wherein a macroscopic dipole of the structure produces a voltage when the structure is subjected to a force from the anode or the solid-electrolyte interphase layer formed on the anode, and wherein the macroscopic dipole of the structure is oriented relative to the force such that the voltage reduces an overpotential that causes solid-electrolyte interphase layer growth.

16. The method of claim 15 wherein:

the structure comprises units distributed in a matrix, the units comprising the piezoelectric material, the structure contacting at least a portion of the solid-electrolyte interphase layer of the anode.

17. The method of claim 15 wherein:

the electrochemical cell comprises a separator that prevents electronic conduction between the anode and the cathode and that permits ionic conduction via the electrolyte, and the structure comprises a layer of the piezoelectric material, the layer being coated on a surface of the separator.

18. The method of claim 15 wherein:

the electrochemical cell comprises a separator that prevents electronic conduction between the anode and the cathode and that permits ionic conduction via the electrolyte, the separator comprising a second piezoelectric material, and the structure comprises a layer of the piezoelectric material, the layer being coated on a surface of the separator.

19. The method of claim 15 wherein:

the electrochemical cell comprises a separator that prevents electronic conduction between the anode and the cathode and that permits ionic conduction via the electrolyte, the structure comprises a layer of the piezoelectric material, the layer being coated on a first surface of the separator, the layer contacting the solid-electrolyte interphase layer formed on the anode, and the electrochemical cell further comprises a second structure comprising a second layer comprising a second piezoelectric material, the second layer being coated on a second surface of the separator, the second layer contacting a second solid-electrolyte interphase layer formed on the cathode.

20. The method of claim 15 wherein:

the electrochemical cell comprises a separator that prevents electronic conduction between the anode and the cathode and that permits ionic conduction via the electrolyte, the separator comprising a third piezoelectric material, and the structure comprises a layer of the piezoelectric material, the layer being coated on a first surface of the separator, the layer contacting the solid-electrolyte interphase layer formed on the anode, and the electrochemical cell further comprises a second structure comprising a second layer comprising a second piezoelectric material, the second layer being coated on a second surface of the separator, the second layer contacting a second solid-electrolyte interphase layer formed on the cathode.

* * * * *